US010664960B1

(12) United States Patent
Lee

(10) Patent No.: US 10,664,960 B1
(45) Date of Patent: May 26, 2020

(54) IMAGE PROCESSING DEVICE AND METHOD TO PERFORM LOCAL CONTRAST ENHANCEMENT

(71) Applicant: HANWHA TECHWIN CO., LTD., Seongnam-si (KR)

(72) Inventor: Changmin Lee, Seongnam-si (KR)

(73) Assignee: HANWHA TECHWIN CO., LTD., Seongnam-si ( * ) Notice: Subject to any disclaimer, the term of this patent is extended or adjusted under 35 U.S.C. 154(b) by 0 days.

(21) Appl. No.: 16/384,840

(22) Filed: Apr. 15, 2019

(51) Int. Cl.
G06K 9/00 (2006.01)
G06T 5/00 (2006.01)
G06T 5/50 (2006.01)
H04N 5/235 (2006.01)

(52) U.S. Cl.
CPC ............ G06T 5/008 (2013.01); G06T 5/50 (2013.01); H04N 5/2355 (2013.01); H04N 5/2356 (2013.01); G06T 2207/20208 (2013.01)

(58) Field of Classification Search
CPC . G06T 5/008; G06T 5/50; G06T 2207/20208; H04N 5/2355; H04N 5/2356
See application file for complete search history.

(56) References Cited

U.S. PATENT DOCUMENTS

| | | | | |
|---|---|---|---|---|
| 6,137,533 A * | 10/2000 | Azim | .................... | H04N 5/2352 348/222.1 |
| 6,141,399 A * | 10/2000 | Tsujii | .................... | G01N 23/04 378/62 |
| 8,750,608 B2 | 6/2014 | Jang | | |
| 9,077,905 B2 | 7/2015 | Fukui | | |
| 2002/0168109 A1 * | 11/2002 | Shinbata | ................. | G06T 5/009 382/191 |
| 2005/0226526 A1 * | 10/2005 | Mitsunaga | .......... | H04N 1/3935 382/274 |
| 2007/0053607 A1 * | 3/2007 | Mitsunaga | ............... | H04N 5/20 382/274 |
| 2007/0071350 A1 * | 3/2007 | Lee | ......................... | G06T 5/008 382/260 |
| 2007/0080975 A1 * | 4/2007 | Yamashita | .............. | G09G 5/04 345/591 |

(Continued)

FOREIGN PATENT DOCUMENTS

| | | | | |
|---|---|---|---|---|
| JP | 2000115534 A * | 4/2000 | ............ | H04N 1/407 |
| KR | 10-2012-0114899 | 10/2012 | | |
| KR | 10-2018-0045259 | 5/2018 | | |

*Primary Examiner* — Aaron W Carter
(74) *Attorney, Agent, or Firm* — H.C. Park & Associates, PLC

(57) ABSTRACT

A image processing device includes a first interface to receive a first frame having a first pixel value with a first dynamic range; a dynamic range converter to convert the first pixel value having the first dynamic range into a second pixel value having a second dynamic range according to a conversion gain factor to generate a second frame having the second pixel value with the second dynamic range, the second dynamic range being less than the first dynamic range; a weight generator to receive the conversion gain factor and to generate a first contrast weight signal depending on the conversion gain factor; and a contrast modifier to enhance a local contrast of the second frame by adjusting the second pixel value of the second dynamic range based on the first contrast weight signal.

16 Claims, 16 Drawing Sheets

(56) References Cited

U.S. PATENT DOCUMENTS

| | | | |
|---|---|---|---|
| 2007/0109447 A1* | 5/2007 | Yamashita | G06T 5/004 348/602 |
| 2007/0188623 A1* | 8/2007 | Yamashita | G06T 5/004 348/222.1 |
| 2010/0157078 A1* | 6/2010 | Atanassov | G06T 5/007 348/222.1 |
| 2010/0195901 A1* | 8/2010 | Andrus | H04N 5/213 382/162 |
| 2012/0170842 A1* | 7/2012 | Liu | G06T 5/50 382/167 |
| 2012/0189206 A1* | 7/2012 | Iketani | G06T 5/004 382/190 |
| 2012/0257824 A1* | 10/2012 | Jang | G06T 5/009 382/166 |
| 2014/0254928 A1* | 9/2014 | Tsai | G06T 5/008 382/166 |
| 2016/0150146 A1* | 5/2016 | You | H04N 5/2355 348/241 |
| 2018/0047176 A1* | 2/2018 | Toyoda | G06T 5/50 |

* cited by examiner

FIG. 2
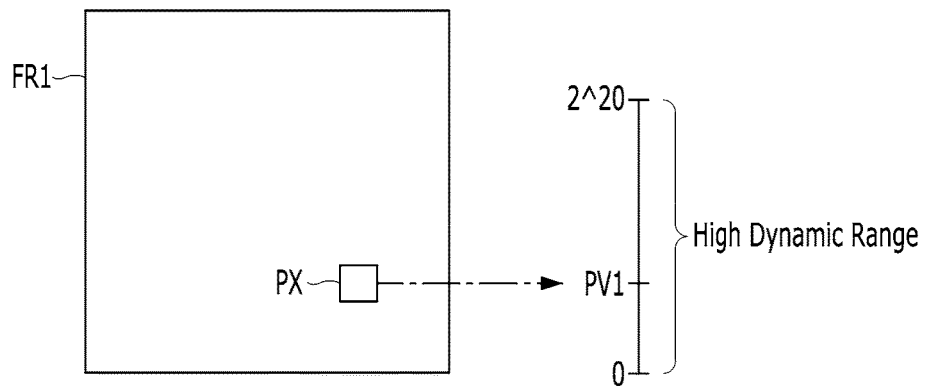
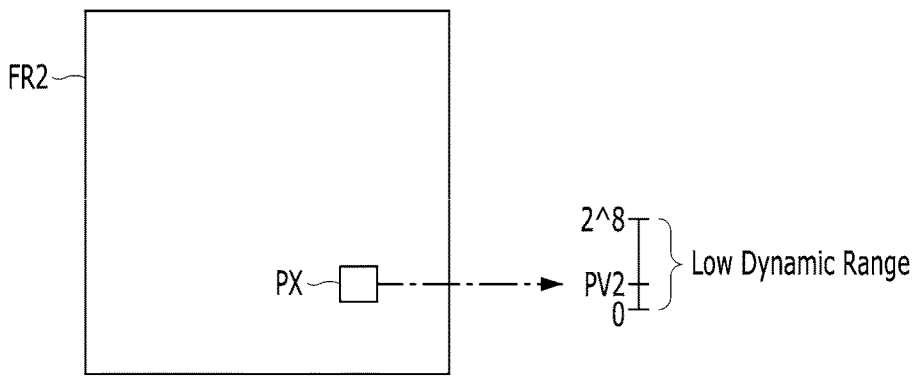
FIG. 3
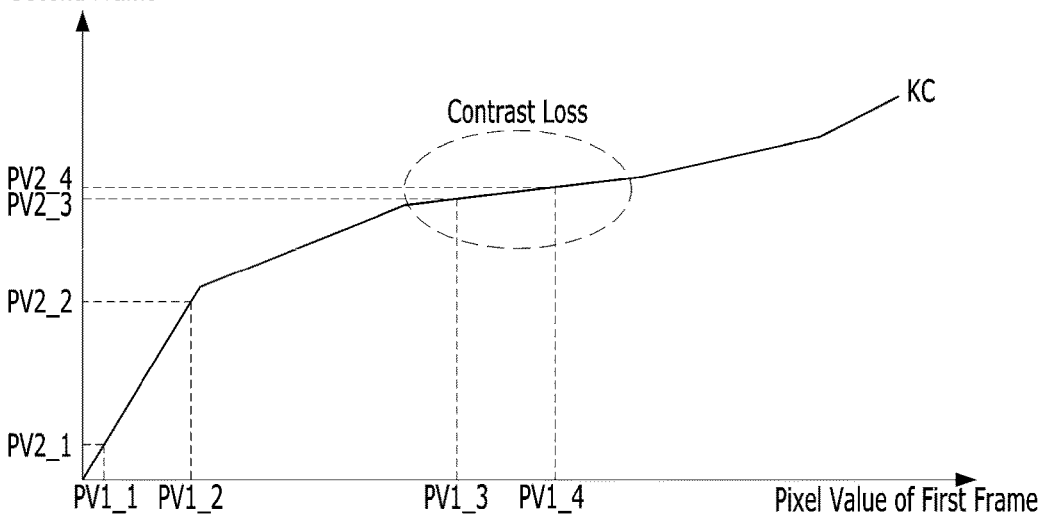

IMAGE PROCESSING DEVICE AND METHOD TO PERFORM LOCAL CONTRAST ENHANCEMENT

BACKGROUND

Field

The invention relates generally to electronic devices and methods for processing video frames, and more particularly, to image processing devices and methods for performing local contrast enhancement.

DISCUSSION OF THE BACKGROUND

Recently, user demand for image capturing apparatus, such as digital cameras, digital camcorders, and camera phones, is rapidly increasing. Accordingly, image capturing apparatus have become more sophisticated and have more diverse functions.

Wide dynamic range imaging refers to a technique of more accurately representing in a digital image the range of luminance that human vision can accommodate when viewing a real nature scene. For example, a video frame of the wide dynamic range may be obtained by capturing a short exposure image and a long exposure image and synthesizing the captured images. Wide dynamic range imaging can be used in a wide variety of applications such as medical imaging, satellite imaging, physical substrate rendering, and digital cinema.

The range of luminance a display device can represent is less than the range of luminance a human eye can perceive. Thus, in order to display data having a wide dynamic range on a display device, an appropriate conversion technique is needed. One type of common conversion technique is called tone mapping.

Examples of conventional tone mapping methods include a Reinhard method, Fast Tone Mapping, and Tone Mapping using an image color appearance model. However, these tone mapping methods may suffer from loss of local contrast and details particularly in dark regions.

The above information disclosed in this Background section is only for enhancement of understanding of the background of the inventive concepts, and, therefore, it may contain information that does not form the prior art that is already known to a person of ordinary skill in the art.

SUMMARY

Image processing devices constructed according to, and methods employing, the principles and exemplary implementations of the invention are capable of performing improved local contrast enhancement for frames. For example, this may be achieved by performing the local contrast enhancement for the frames based on contrast weights determined based upon conversion gain factors that are associated with a tone mapping operation.

Additional aspects will be set forth in the detailed description which follows, and, in part, will be apparent from the disclosure, or may be learned by practice of the inventive concepts.

A image processing device constructed according to one or more embodiments includes: a first interface to receive a first frame having a first pixel value with a first dynamic range; a dynamic range converter to convert the first pixel value having the first dynamic range into a second pixel value having a second dynamic range according to a conversion gain factor to generate a second frame having the second pixel value with the second dynamic range, the second dynamic range being less than the first dynamic range; a weight generator to receive the conversion gain factor and to generate a first contrast weight signal depending on the conversion gain factor; and a contrast modifier to enhance a local contrast of the second frame by adjusting the second pixel value of the second dynamic range based on the first contrast weight signal.

The weight generator may be operable to increase the first contrast weight signal as the conversion gain factor decreases.

The contrast modifier may include: a contrast mask to generate a variation value from the second pixel value; a first local processor to modify the variation value based on the first contrast weight signal; and a second local processor to adjust the second pixel value according to the modified variation value to provide the second frame having the enhanced local contrast.

The image processing device may include: a second interface to receive sub frames; and a dynamic range synthesizer to synthesize the sub frames to generate the first frame having the first pixel value with the first dynamic range, wherein the dynamic range synthesizer may be operable to adjust a pixel value of a first sub frame of the sub frames using a first synthesis weight, to adjust a pixel value of a second sub frame of the sub frames using a second synthesis weight, and to determine the first pixel value of the first frame according to the adjusted pixel value of the first sub frame and the adjusted pixel value of the second sub frame, the second synthesis weight being decreased as the first synthesis weight increases.

The weight generator may be operable to provide a second contrast weight signal associated with at least one of the first synthesis weight and the second synthesis weight; and the contrast modifier may be operable to adjust the second pixel value having the second dynamic range further based on the second contrast weight signal.

The contrast modifier may include: a first local processor to multiply the first contrast weight signal by the second contrast weight signal to generate a third contrast weight signal; a contrast mask to generate a variation value from the second pixel value; a second local processor to modify the variation value by reflecting the third contrast weight signal in the variation value; and a third local processor to adjust the second pixel value according to the modified variation value to provide the second frame having the enhanced local contrast.

The second sub frame may be captured using an exposure time shorter than an exposure time of the first sub frame; and the second contrast weight signal may decrease as the second synthesis weight increases.

The second sub frame may be captured using an exposure time shorter than that of the first sub frame; the dynamic range synthesizer may be operable to determine one synthesis level of a predetermined range based on at least one of a luminance of the pixel value of the first sub frame and a luminance of the pixel value of the second sub frame, and to determine the first synthesis weight and the second synthesis weight depending on the determined synthesis level, the second synthesis weight being increased as the determined synthesis level increases; the weight generator may be operable to provide a second contrast weight signal in response to the determined synthesis level; and the contrast modifier may be operable to adjust the second pixel value having the second dynamic range further based on the second contrast weight signal.

The second contrast weight signal may decrease as the determined synthesis level increases.

The second sub frame may be captured using an exposure time shorter than an exposure time of the first sub frame; the weight generator may be operable to provide a third contrast weight signal as a ratio of the exposure time of the second sub frame to the exposure time of the first sub frame; and the contrast modifier may be operable to adjust the second pixel value having the second dynamic range further based on the third contrast weight signal.

The third contrast weight signal may decrease as the ratio decreases.

The dynamic range converter may include a tone mapper to convert the first pixel value having the first dynamic range into the second pixel value having the second dynamic range based on the conversion gain factor.

The contrast modifier may include a local contrast enhancer to enhance the local contrast of the second frame.

A method of performing a local contrast enhancement according to one or more embodiments includes steps of: capturing in an image capture device a first frame having a first pixel value with a first dynamic range; determining a conversion gain factor for the first pixel value; converting the first pixel value having the first dynamic range into a second pixel value having a second dynamic range according to the conversion gain factor to generate a second frame having the second pixel value with the second dynamic range, the second dynamic range being less than the first dynamic range; generating a first contrast weight signal depending on the conversion gain factor; and enhancing a local contrast of the second frame by adjusting the second pixel value having the second dynamic range based on the first contrast weight signal.

The step of generating a first contrast weight signal may include increasing the first contrast weight signal as the conversion gain factor decreases.

The step of enhancing a local contrast of the second frame may include: generating a variation value from the second pixel value; modifying the variation value based on the first contrast weight signal; and adjusting the second pixel value based on the modified variation value to generate the second frame having the enhanced local contrast.

The method may further include steps of: receiving sub frames in a storage device; and synthesizing at least two of the sub frames to generate the first frame having the first pixel value with the first dynamic range by: adjusting a pixel value of a first sub frame of the sub frames using a first synthesis weight; adjusting a pixel value of a second sub frame of the sub frames using a second synthesis weight; and determining the first pixel value of the first frame according to the adjusted pixel value of the first sub frame and the adjusted pixel value of the second sub frame, the second synthesis weight being decreased as the first synthesis weight increases.

The method may further include the step of generating a second contrast weight signal associated with at least one of the first synthesis weight and the second synthesis weight, wherein the step of enhancing a local contrast of the second frame may include adjusting the second pixel value having the second dynamic range further based on the second contrast weight signal.

The second sub frame may be captured using an exposure time shorter than an exposure time of the first sub frame; and the second contrast weight signal may decrease as the second synthesis weight increases.

The method may further include the step of generating a third contrast weight signal as a ratio of the exposure time of the second sub frame to the exposure time of the first sub frame, wherein the second sub frame may be captured using an exposure time shorter than an exposure time of the first sub frame, and wherein the step of enhancing a local contrast of the second frame may include adjusting the second pixel value having the second dynamic range further based on the third contrast weight signal.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts.

FIG. 2 is a conceptual view illustrating an exemplary embodiment of a first frame input to a tone mapper of FIG. 1 and a second frame output from the tone mapper.

FIG. 3 is an exemplary graph of a knee curve function provided by the knee curve generator of FIG. 1.

DETAILED DESCRIPTION

Figure 1:
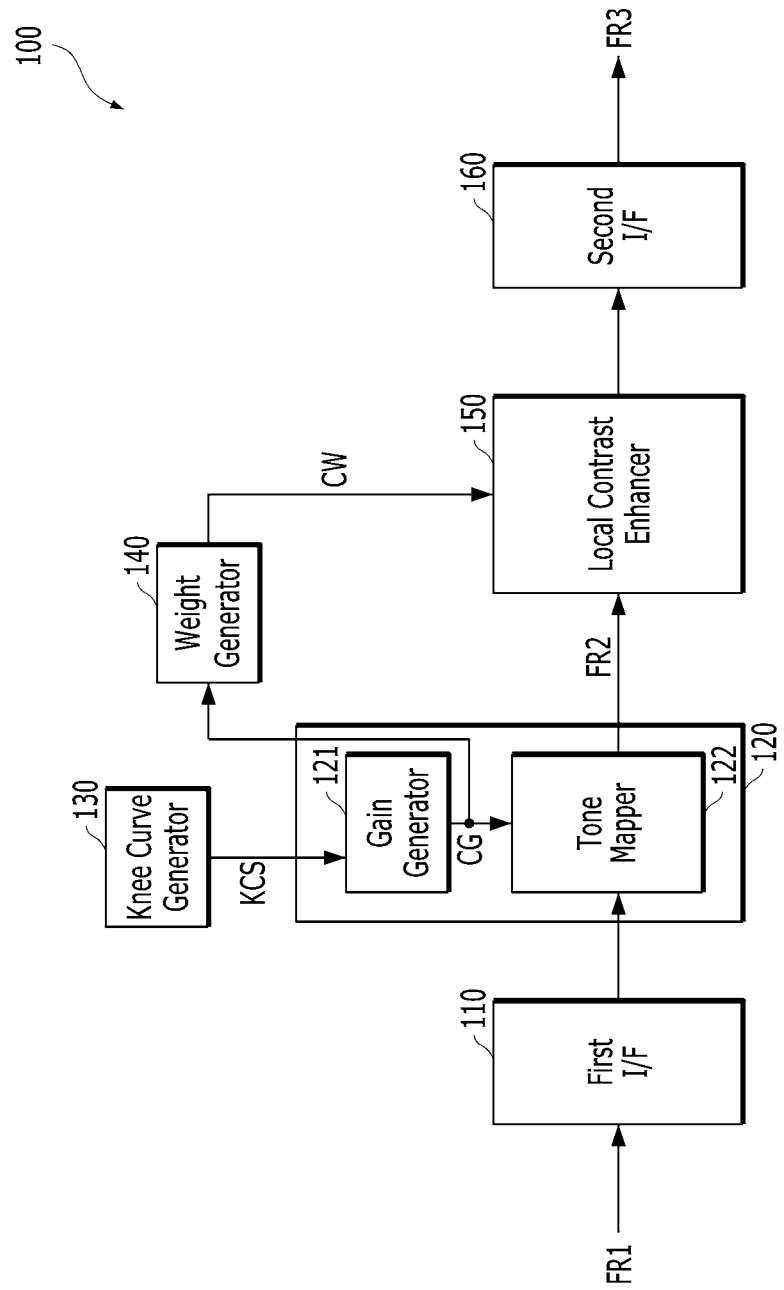
FIG. 1 is a block diagram of an exemplary embodiment of an image processing device constructed according to the principles of the invention.

In the following description, for the purposes of explanation, numerous specific details are set forth in order to provide a thorough understanding of various exemplary embodiments or implementations of the invention. As used herein "embodiments" and "implementations" are interchangeable words that are non-limiting examples of devices or methods employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, and characteristics of an exemplary embodiment may be used or implemented in another exemplary embodiment without departing from the inventive concepts.

Unless otherwise specified, the illustrated exemplary embodiments are to be understood as providing exemplary features of varying detail of some ways in which the inventive concepts may be implemented in practice. Therefore, unless otherwise specified, the features, components, modules, layers, films, panels, regions, and/or aspects, etc. (hereinafter individually or collectively referred to as "elements"), of the various embodiments may be otherwise combined, separated, interchanged, and/or rearranged without departing from the inventive concepts.

The use of cross-hatching and/or shading in the accompanying drawings is generally provided to clarify boundaries between adjacent elements. As such, neither the presence nor the absence of cross-hatching or shading conveys or indicates any preference or requirement for particular materials, material properties, dimensions, proportions, commonalities between illustrated elements, and/or any other characteristic, attribute, property, etc., of the elements, unless specified. Further, in the accompanying drawings, the size and relative sizes of elements may be exaggerated for clarity and/or descriptive purposes. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. To this end, the term "connected" may refer to physical, electrical, and/or fluid connection, with or without intervening elements. Further, the D1-axis, the D2-axis, and the D3-axis are not limited to three axes of a rectangular coordinate system, such as the x, y, and z-axes, and may be interpreted in a broader sense. For example, the D1-axis, the D2-axis, and the D3-axis may be perpendicular to one another, or may represent different directions that are not perpendicular to one another. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various types of elements, these elements should not be limited by these terms. These terms are used to distinguish one element from another element. Thus, a first element discussed below could be termed a second element without departing from the teachings of the disclosure.

Spatially relative terms, such as "beneath," "below," "under," "lower," "above," "upper," "over," "higher," "side" (e.g., as in "sidewall"), and the like, may be used herein for descriptive purposes, and, thereby, to describe one elements relationship to another element(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

In exemplary embodiments, an image processing device, an image capturing apparatus, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to one or more exemplary embodiments, the features, functions, processes, etc., described herein may be implemented via software, hardware (e.g., general processor, digital signal processing (DSP) chip, an application specific integrated circuit (ASIC), field programmable gate arrays (FPGAs), firmware, or a combination thereof. In this manner, the image processing device, the image capturing apparatus, and/or one or more components thereof may include or otherwise be associated with one or more memories (not shown) including code (e.g., instructions) configured to cause the image processing device, the image capturing apparatus, and/or one or more components thereof to perform one or more of the features, functions, processes, etc., described herein.

The memories may be any medium that participates in providing code to the one or more software, hardware, and/or firmware components for execution. Such memories may be implemented in any suitable form, including, but not limited to, non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a compact disk-read only memory (CD-ROM), a rewriteable compact disk (CD-RW), a digital video disk (DVD), a rewriteable DVD (DVD-RW), any other optical medium, punch cards, paper tape, optical mark sheets, any other physical medium with patterns of holes or other optically recognizable indicia, a random-access memory (RAM), a programmable read only memory (PROM), and erasable programmable read only memory (EPROM), a FLASH-EPROM, any other memory chip or cartridge, a carrier wave, or any other medium from which information may be read by, for example, a controller/processor.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and should not be interpreted in an idealized or overly formal sense, unless expressly so defined herein.

Figure 4:
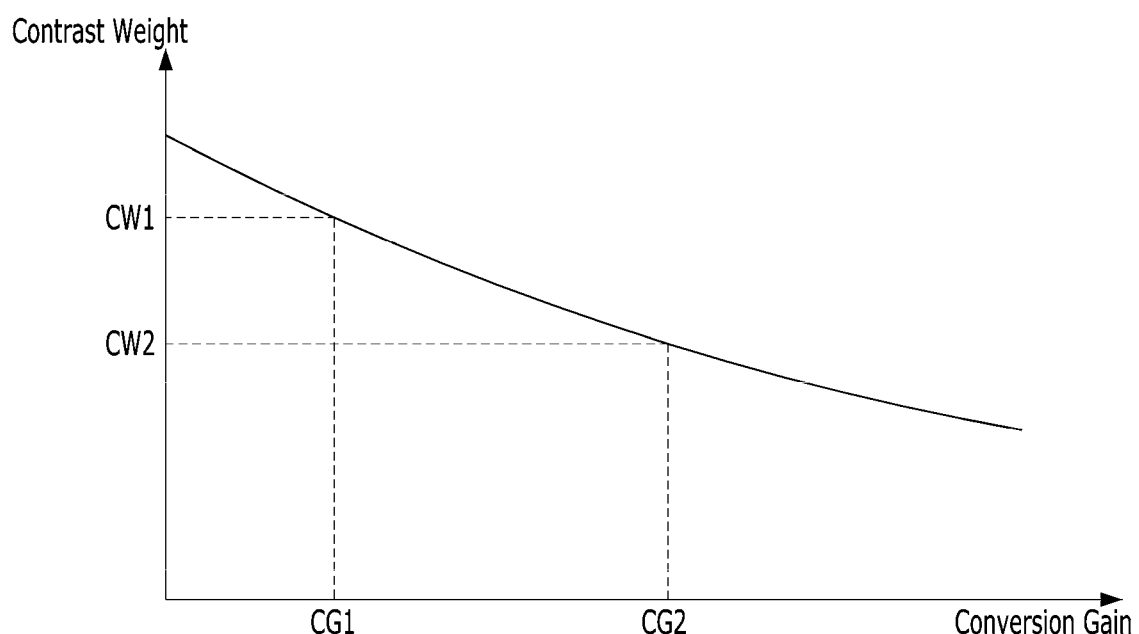
FIG. 4 is an exemplary graph of a contrast weight function generated by the weight generator of FIG. 1.

FIG. 1 is a block diagram of an exemplary embodiment of an image processing device constructed according to the principles of the invention. FIG. 2 is a conceptual view illustrating an exemplary embodiment of a first frame input to a tone mapper of FIG. 1 and a second frame output from the tone mapper. FIG. 3 is an exemplary graph of a knee curve function provided by the knee curve generator of FIG. 1. FIG. 4 is an exemplary graph of a contrast weight function generated by the weight generator of FIG. 1.

Referring to FIG. 1, an image processing device 100 may include a first interface 110, a tone mapping circuit 120, a knee curve generator 130, a weight generator 140, a local contrast enhancer 150, and a second interface 160.

The first interface 110 operates in response to a control signal of the tone mapping circuit 120 to receive a first frame FR1 having pixel values with a first dynamic range. The first interface 110 may provide the tone mapping circuit 120 with an interface for communicating with other components, such as a buffer memory. The first frame FR1 may be obtained by capturing a frame at an image sensor or by capturing sub frames at the image sensor and synthesizing the sub frames. The processes described herein may be performed in a unit of a pixel value of the first frame FR1. However, exemplary embodiments of the invention are not limited thereto. For example, the first frame FR1 may include region values each representing a plurality of pixel values, and the processes may be performed in a unit of the region value. In this manner, additional components for calculating the region values from the pixel values of the first frame FR1 may further be provided. Hereinafter, exemplary embodiments to process using a unit of the pixel value will be described for descriptive convenience.

A dynamic range converter such as the tone mapping circuit 120 communicates with the first interface 110 and the local contrast enhancer 150. The tone mapping circuit 120 may include a gain generator 121 and a tone mapper 122. The gain generator 121 generates conversion gain factors CG corresponding to respective pixel values of the first frame FR1. The gain generator 121 may generate the conversion gain factor corresponding to each pixel value of the first frame FR1 by using a knee curve signal KCS provided by the knee curve generator 130.

The tone mapper 122 receives the first frame FR1 through the first interface 110 and receives the conversion gain factors CG from the gain generator 121. The tone mapper 122 may generate a second frame FR2 of a second dynamic range from the first frame FR1 of the first dynamic range by using the conversion gain factors CG, the second dynamic range being less than the first dynamic range. Referring to FIG. 2 together with FIG. 1, a pixel PX of the first frame FR1 may have a first pixel value PV1 in a high dynamic range. The high dynamic range may be a range of 0 to $2^{20}$ that is expressed by 20 number of data bits. Each pixel of the first frame FR1 may have one of various colors such as red, blue, green, yellow, etc. The tone mapper 122 may convert the first pixel value PV1 into a second pixel value PV2 having a low dynamic range by using the conversion gain factor corresponding to the pixel PX. The low dynamic range may be a range of 0 to $2^8$ that is expressed by 8 number of data bits. In an exemplary embodiment, the tone mapper 122 may multiply the first pixel value PV1 by the conversion gain factor to generate the second pixel value PV2. The tone mapper 122 may generate the second frame FR2 including a pixel PX that has the second pixel value PV2. As such, the tone mapper 122 converts pixel values of the first frame FR1, which have the first dynamic range, respectively into pixel values having the second dynamic range less than the first dynamic range by using the conversion gain factors CG.

In case where the pixel values having the relatively high dynamic range are converted into the pixel values having the relatively low dynamic range, the conversion gain factors CG are properly adjusted since each of the converted pixel values is limited to the low dynamic range. Referring to FIG. 3 together with FIG. 1, the x-axis denotes the pixel value of the first frame FR1 which may be an input value of the tone mapper 122, and the y-axis denotes the pixel value of the second frame FR2 which may be an output value of the tone mapper 122. The relationship between the pixel value of the first frame FR1 and the pixel value of the second frame FR2 may be determined by the conversion gain factors CG. The conversion gain factors CG are provided according to a knee curve KC which may be expressed by the knee curve signal KCS provided by the knee curve generator 130. The conversion gain factors CG may be understood as slopes of the knee curve KC. The knee curve KC of FIG. 3 is an exemplary embodiment, and it is contemplated that the knee curve KC may be changed depending on exemplary embodiments of the image processing device 100, and the knee curve generator 130 may provide the gain generator 121 with the knee curve signal KCS using various algorithms known to those skilled in the art.

The knee curve KC does not have a linearly increasing slope but has at least one knee that is a point varying a slope of the knee curve KC in order to efficiently reflect appearance or visually recognizable information of the pixel values of the first frame FR1 in the pixel values of the second frame FR2. For example, the knee curve KC may have a relatively high slope for relatively low pixel values of the first frame FR1 such that a contrast between the pixel values of the first frame FR1 may be reflected in a contrast between the pixel values of the second frame FR2 at a relatively high degree.

Accordingly, a corresponding scene area of the first frame FR1 such as a region of relatively low brightness may be preserved in the second frame FR2. In FIG. 3, low first pixel values PV1_1 and PV1_2 are converted respectively into second pixel values PV2_1 and PV2_2. For example, the first pixel values PV1_1 and PV1_2 are multiplied by corresponding conversion gain factors on the knee curve KC. A difference between the second pixel values PV2_1 and PV2_2 is relatively high, and a corresponding scene area of the first frame FR1 may be preserved in the second frame FR2 accordingly.

The knee curve KC may have a relatively low slope for relatively high pixel values of the first frame FR1 in order to limit a range of converted pixel values to the second dynamic range. In FIG. 3, high first pixel values PV1_3 and PV1_4 are converted into second pixel values PV2_3 and PV2_4, respectively. On the other hand, a difference between the second pixel values PV2_3 and PV2_4 is less than a difference between the second pixel values PV2_1 and PV2_2 while a difference between the first pixel values PV1_3 and PV1_4 is the same as a difference between the first pixel values PV1_1 and PV1_2. It means that more contrast loss occurs at the second pixel values PV2_3 and PV2_4 than the second pixel values PV2_1 and PV2_2.

Referring back to FIG. 1, the weight generator 140 is coupled to the tone mapping circuit 120 and the local contrast enhancer 150. The weight generator 140 receives the conversion gain factors CG from the gain generator 121, and generates contrast weights CW depending on the conversion gain factors CG, respectively. The weight generator 140 increases the contrast weight as a corresponding conversion gain factor decreases. Referring to FIG. 4 together with FIG. 1, x-axis denotes the conversion gain factor and y-axis denotes the contrast weight. In response to a first conversion gain factor CG1, the weight generator 140 generates a first contrast weight CW1. In response to a second conversion gain factor CG2 greater than the first conversion gain factor CG1, the weight generator 140 generates a second contrast weight CW2 less than the first contrast weight CW2. As such, the contrast weight decreases as the conversion gain factor increases. In an exemplary embodiment, the contrast weight is inversely proportional to the contrast gain.

Referring back to FIG. 1, the local contrast enhancer 150 communicates with the tone mapping circuit 120 and the second interface 160. The local contrast enhancer 150 receives the second frame FR2 from the tone mapping circuit 120, enhances local contrast values of the second frame FR2 by adjusting the pixel values of the second frame FR2, and outputs the second frame FR2 having the enhanced local contrast values as a third frame FR3. The local contrast enhancer 150 may generate variation values from the pixel values of the second frame FR2, and may adjust the pixel values of the second frame FR2 according to the variation values. In an exemplary embodiment, the local contrast enhancer 150 includes a contrast mask including one or more low pass filters for the pixel values of the second frame FR2, and determines the variation values using the contrast mask.

The local contrast enhancer 150 receives the contrast weights CW from the weight generator 140. The local contrast enhancer 150 enhances local contrasts of the second frame FR2 based on the contrast weights CW. The local contrast enhancer 150 may modify the variation values according to the contrast weights CW, respectively, and may adjust the pixel values of the second frame FR2 according to the modified variation values. The variation value may be modified to increase as a corresponding contrast weight increases, and the pixel value may increase as a corresponding modified variation value increases. For instance, the local contrast enhancer 150 may multiply the variation values by the contrast weights CW, respectively, to modify the variation values. The local contrast enhancer 150 may then add the modified variation values to the pixel values of the second frame FR2 to adjust the pixel values of the second frame FR2.

The second frame FR2 may include some pixel values at which more contrast loss occurred in converting the first frame FR1 into the second frame FR2 than other pixel values as described with reference to FIG. 3. More specifically, contrast loss associated with some pixel values may increase as corresponding conversion gain factors decrease when converting the first frame FR1 into the second frame FR2. The contrast loss occurring when converting the first frame FR1 into the second frame FR2 may be compensated when performing the local contrast enhancement by the local contrast enhancer 150. The weight generator 140 controls the contrast weight to increase as the corresponding conversion gain factor decreases as described with reference to FIG. 1. Thus, a variation value to be used for the local contrast enhancement is weighted with an increased contrast weight, and the contrast loss that occurs in converting the first frame FR1 into the second frame FR2 in association with the pixel value may be compensated for with the increased contrast weight. Accordingly, the image processing device 100 outputting the third frame FR3 having improved local contrasts may be provided.

In an exemplary embodiments, the first interface 110, the tone mapping circuit 120, the knee curve generator 130, the weight generator 140, the local contrast enhancer 150, and the second interface 160 each may be implemented via software, a hardware chip, an application ASIC, FPGAs, firmware, or a combination thereof. In case where the component is implemented via software, firmware, or a combination thereof, the image processing device 100 may include one or more processors and one or more memories including code (e.g., instructions) configured to cause the one or more processors to perform operations and/or functions of the component.

Figure 5:
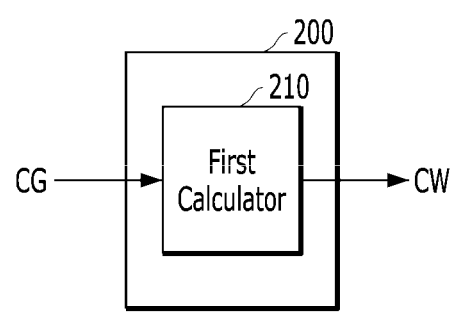
FIG. 5 is a block diagram of an exemplary embodiment of the weight generator of FIG. 1.

FIG. 5 is a block diagram of an exemplary embodiment of the weight generator of FIG. 1.

Referring to FIGS. 1 and 5, weight generator 200 may include a first calculator 210 which receives the conversion gain factors CG from the tone mapping circuit 120 and outputs the contrast weights CW. The first calculator 210 may determine the contrast weights CW by processing the contrast gains CG, respectively, according to the following equations 1 and 2.

$$comp = \frac{1}{cg} \qquad \text{Eq. 1}$$

$$cw = e^{comp+a} \qquad \text{Eq. 2}$$

cg denotes the conversion gain factor, a denotes an adjustable constant, and cw is the contrast weight. The contrast weight cw is inversely proportional to the contrast gain cg according to the equations 1 and 2.

Figure 6:
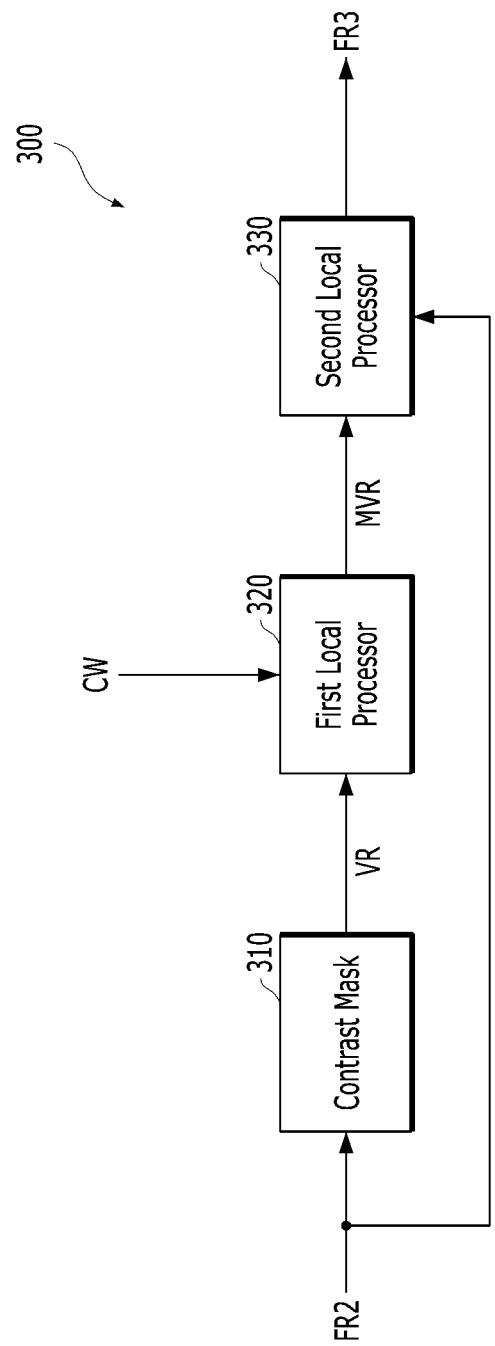
FIG. 6 is a block diagram of an exemplary embodiment of the local contrast enhancer of FIG. 1.

FIG. 6 is a block diagram of an exemplary embodiment of the local contrast enhancer of FIG. 1.

Referring to FIGS. 1 and 6, a local contrast enhancer 300 may include a contrast mask 310, a first local processor 320, and a second local processor 330. The contrast mask 310 provides the first local processor 320 with variation values VR in response to the pixel values of the second frame FR2. The contrast mask 310 may determine the variation values VR in various manners known to those skilled in the art. In an exemplary embodiment, the contrast mask 310 includes one or more low pass filters that receive the pixel values of the second frame FR2 and a calculator to subtract output values of the one or more low pass filters from the pixel values of the second frame FR2 to provide the variation values VR.

The first local processor 320 receives the variation values VR and the contrast weights CW from the contrast mask 310 and the weight generator 140, respectively. The first local processor 320 modifies the variation values VR according to the contrast weights CW. For example, the first local processor 320 may multiply the variation values VR by the contrast weights CW to generate the modified variation values MVR, which is transferred to the second local processor 330. The second local processor 330 receives the pixel values of the second frame FR2 from the tone mapping circuit 120, and adjusts the pixel values of the second frame FR2 according to the modified variation values MVR. For instance, the second local processor 320 may add the modified variation values MVR to the pixel values of the second frame FR2 to determine pixel values of the third frame FR3, which is output through the second interface 160.

Figure 7:
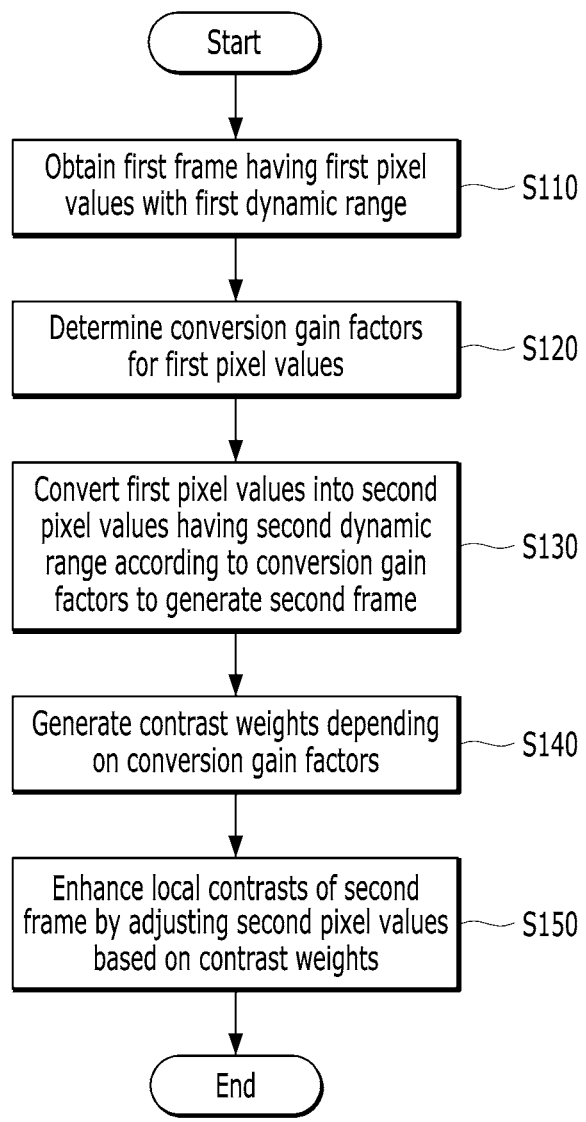
FIG. 7 is a flowchart of an exemplary embodiment of a method of operating the image processing device according to the principles of the invention.

FIG. 7 is a flowchart of an exemplary embodiment of a method of operating the image processing device according to the principles of the invention.

Referring to FIG. 7, at step S110, a first frame having first pixel values with a first dynamic range is obtained. At step S120, conversion gain factors for the first pixel values of the first frame are determined. The conversion gain factors may be determined from a knee curve KC shown in FIG. 3. The knee curve KC may be changed depending on exemplary embodiments of the image processing device 100. For example, histograms may be generated from one or more frames including the first frame, and the knee curve KC may be determined based on the histograms.

At step S130, the first pixel values of the the first frame are converted into second pixel values having a second dynamic range according to the conversion gain factors to generate a second frame including the second pixel values. Here, the second dynamic range may be less than the first dynamic range. That is, the number of data bits for each of the second pixel values is less than the number of data bits for each of the first pixel values. The first pixel values may be multiplied by the conversion gain factors, respectively, to generate the second pixel values. More contrast loss occurs at the second pixel values converted by using a relatively low conversion gain factor than at the first pixel values.

At step S140, contrast weights are generated depending on the conversion gain factors, respectively. The contrast weight increases as a corresponding conversion gain factor decreases. In an exemplary embodiment, the contrast weight is inversely proportional to the contrast gain.

At step S150, a local contrast enhancement is performed on the second frame by adjusting the second pixel values based on the contrast weights. Variation values may be generated from the pixel values of the second frame by using one or more low pass filters, and the variation values may be modified according to the contrast weights, respectively. The pixel values of the second frame may be adjusted according to the modified variation values to generate third pixel values that are included in a third frame. The contrast loss occurring at the second pixel value in converting the first frame into the second frame may be compensated for with the contrast weight when performing the local contrast enhancement, thereby improving the local contrast of the third frame.

Figure 8:
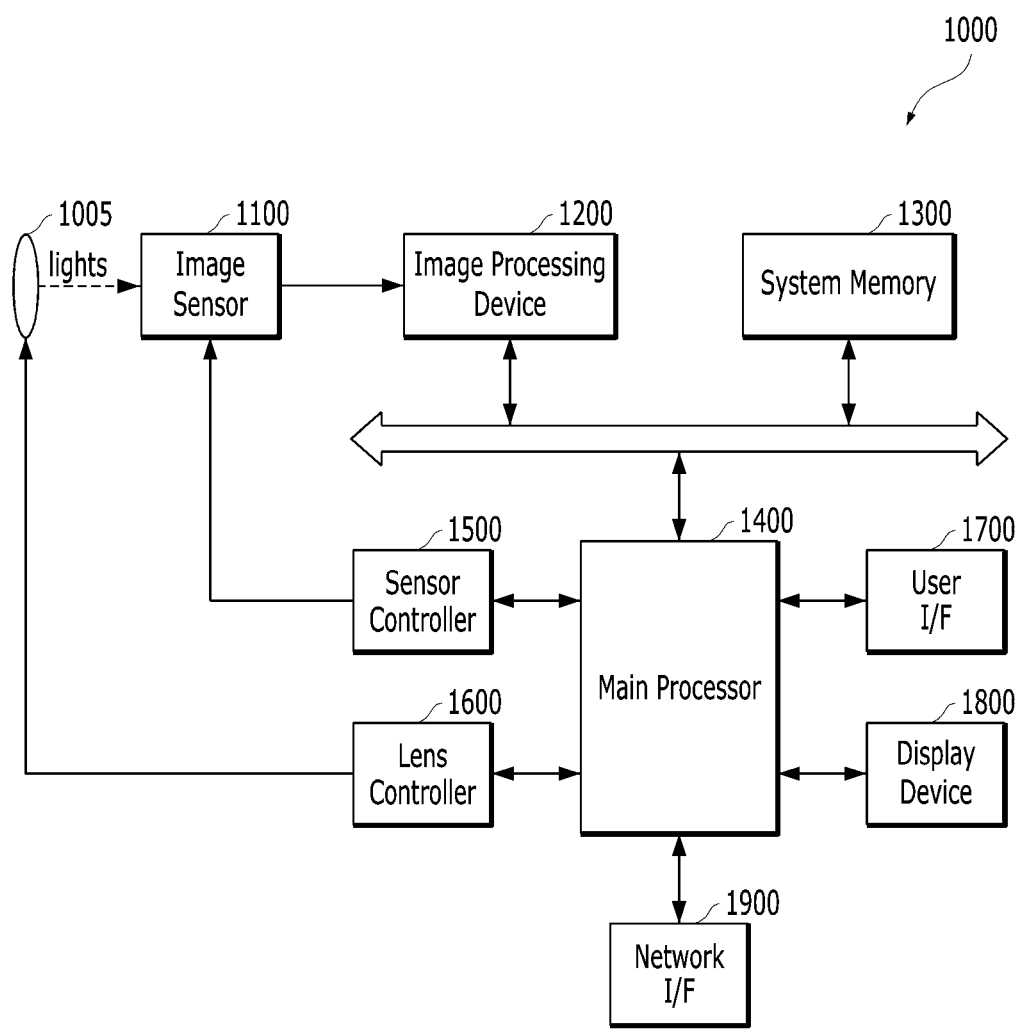
FIG. 8 is a block diagram of an exemplary embodiment of an image capturing apparatus constructed according to the principles of the invention.

FIG. 8 is a block diagram of an exemplary embodiment of an image capturing apparatus constructed according to the principles of the invention.

Referring to FIG. 8, an image capturing apparatus 1000 may include a lens 1005, an image sensor 1100, an image processing device 1200, a system memory 1300, a main processor 1400, a sensor controller 1500, a lens controller 1600, a user interface 1700, a display device 1800, and a network interface 1900.

Lights may be induced through the lens 1005 to the image sensor 1100 and may be converted into pixel values configuring data streams. In a wide dynamic range (WDR) mode, the image sensor 1100 may convert the lights into sub frames that are captured in different conditions such as exposure times. The image sensor 110 receives the lights in each exposure time and converts the received lights into each sub frame having pixel values. The image sensor 1100 may be implemented as a solid-state image sensor such as a Charge Coupled Device (CCD) or a Complementary Metal-Oxide Semiconductor (CMOS). In an exemplary embodiment, the image sensor 1100 may be a color sensor in which color filters of three colors of red, green, and blue are arranged in a bayer arrangement. The sub frame may be provided by repeatedly outputting a pixel row having the order of R, G, R, and G, and outputting a pixel row having the order of B, G, B, and G.

The number of sub frames for synthesizing into one frame may be changed by the sensor controller 1500. For example, if the amount of light entering through the lens 1005 is insufficient and the brightness is lower than the reference value, the number of sub frames may be changed from 4 to 2. If the brightness is sufficient, the number of sub frames may be changed back to 4.

The image processing device 1200 is coupled to the image sensor 1100. The image processing device 1200 may sequentially accumulate pixel rows provided from the image sensor 1100 and may generate sub frames such as a very long frame, a long frame, a short frame, and a very short frame. The image processing device 120 may synthesize a set of the sub frames to generate a single frame such as the first frame FR1 shown in FIG. 1, and may process the synthesized frame to generate an output frame such as the third frame FR3 shown in FIG. 1.

The system memory 1300 may be used as a working memory of the image is processing device 1200 and/or the main processor 1400. In an exemplary embodiment, in the case where some of the components of the image processing device 1200 are implemented via software and/or firmware, program codes may be loaded to the system memory 1300 from a non-volatile storage medium associated with the image capturing device 100, and the program codes may be executed by one or more processors of the image processing device 1200 to perform operations and/or functions of the components. The system memory 1300 may also be used as a buffer memory for operations of the image processing device 1200 and/or the main processor 1400. The system memory is shown as being separate from the image processing device 1200 and the main processor 1400. However, exemplary embodiments are not limited thereto. For example, at least portions of the system memory 1300 may be included in the image processing device 1200 and the main processor 1400. In an exemplary embodiment, the system memory 1300 may include at least one of Static RAM (SRAM), Dynamic RAM (DRAM), and Synchronous DRAM (SDRAM).

The main processor 1400 may control overall operations of the image capturing apparatus 1000. The main processor 1400 may process a user input received through the user interface 1700, may display the frames processed by the image processing device 1200 in the display device 1800, and may transmit the frames processed by the image processing device 1200 through the network interface 1900.

The sensor controller 1500 may control a mechanical or electronic shutter of the image sensor 1100 to adjust the exposure times of the sub frames in response to a control signal of the main processor 1400. The sensor controller 1500 may also vary the number of sub frames captured by the image sensor 1100. The lens controller 1600 may control a focus of the lens 1005.

The user interface 1700 may receive a user input to control various operations of the main processor 1400, and may include a switch, a dial, a touch panel, a voice recognition device, or the like. The user may set various functions such as power on and off, WDR mode on and off, zoom in and out, and image display on/off through the user interface 1700.

The display device 1800 may display the frames processed by the image processing device 1200 in response to a control signal of the main processor 1400. The display device 1800 may be turned on and off by the user input received through the user interface 1700. The display device 1800 may include a liquid crystal display (LCD), an organic light-emitting diode (OLED), a cathode ray tube (CRT) or other display devices known in the art.

The network interface 1900 provides communications between the image capturing apparatus 1000 and an external device coupled through a network. The network interface 1900 may receive control signals from the external device, and may transmit the frames processed by the image processing device 1200 to the external device in response to a control signal of the main processor 1400.

Figure 9:
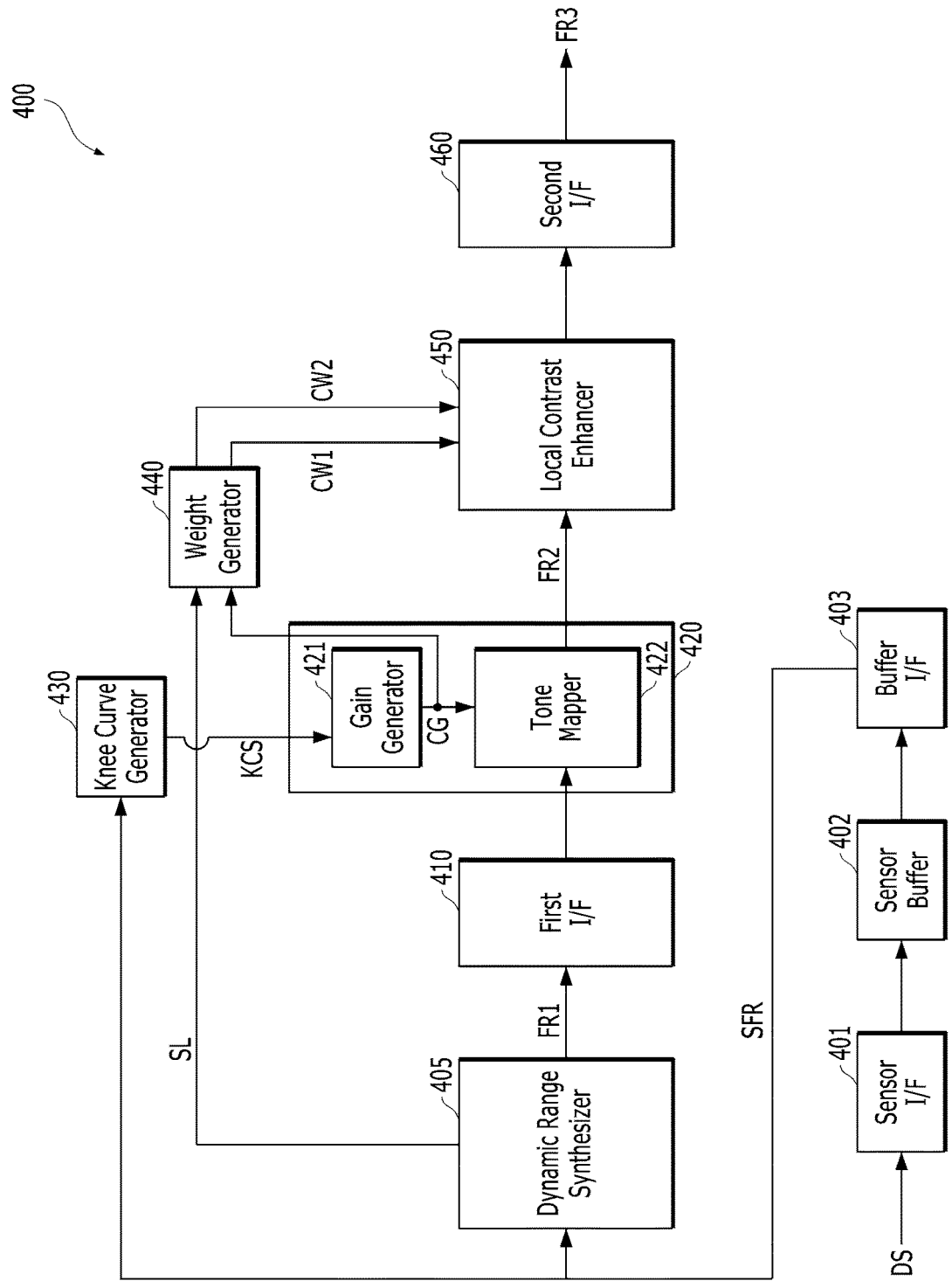
FIG. 9 is a block diagram of an exemplary embodiment of the image processing device of FIG. 8.
Figure 10:
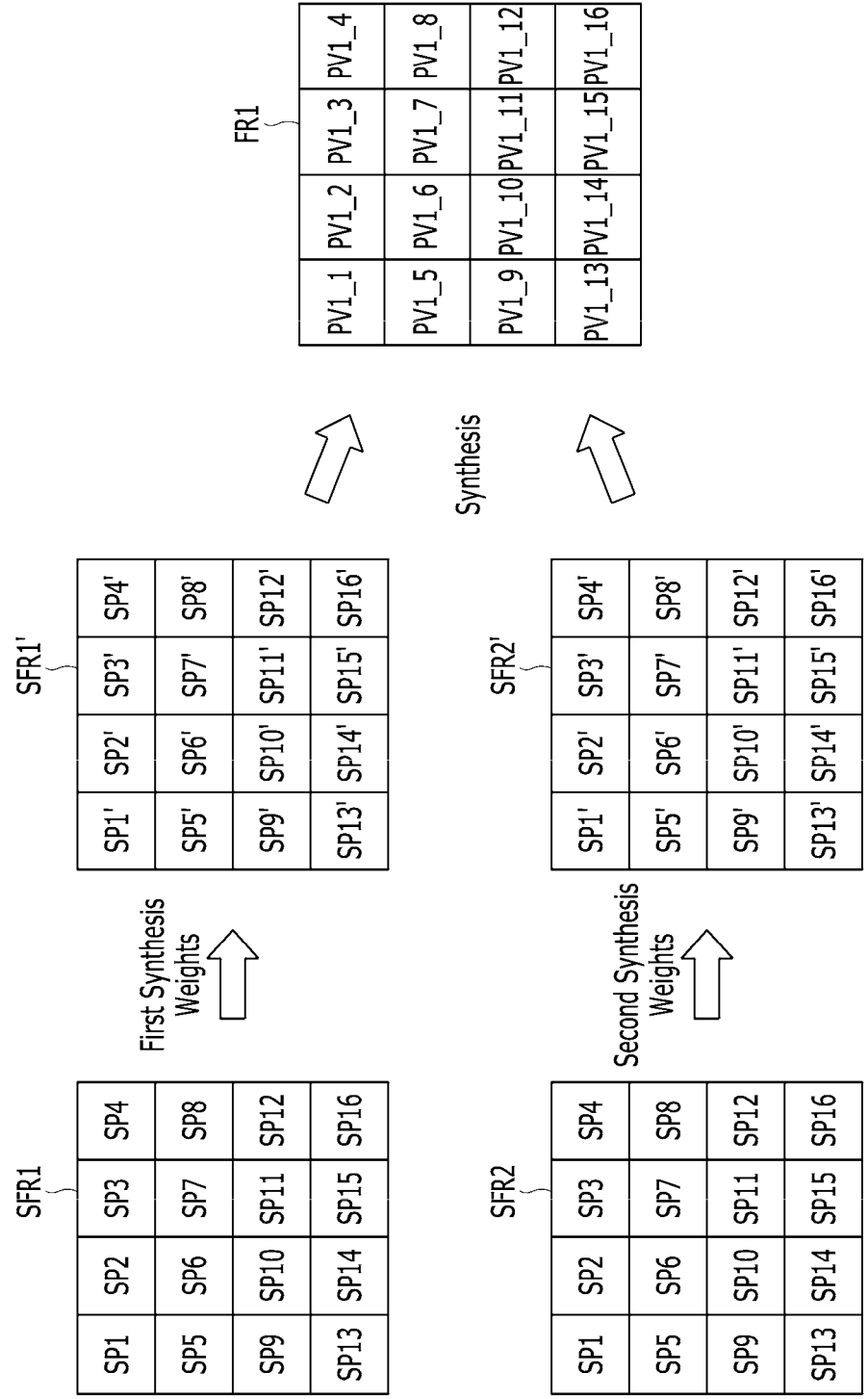
FIG. 10 is a conceptual view of an exemplary embodiment of sub frames input to the dynamic range synthesizer of FIG. 9 and a synthesized frame output from the dynamic range synthesizer.
Figure 11:
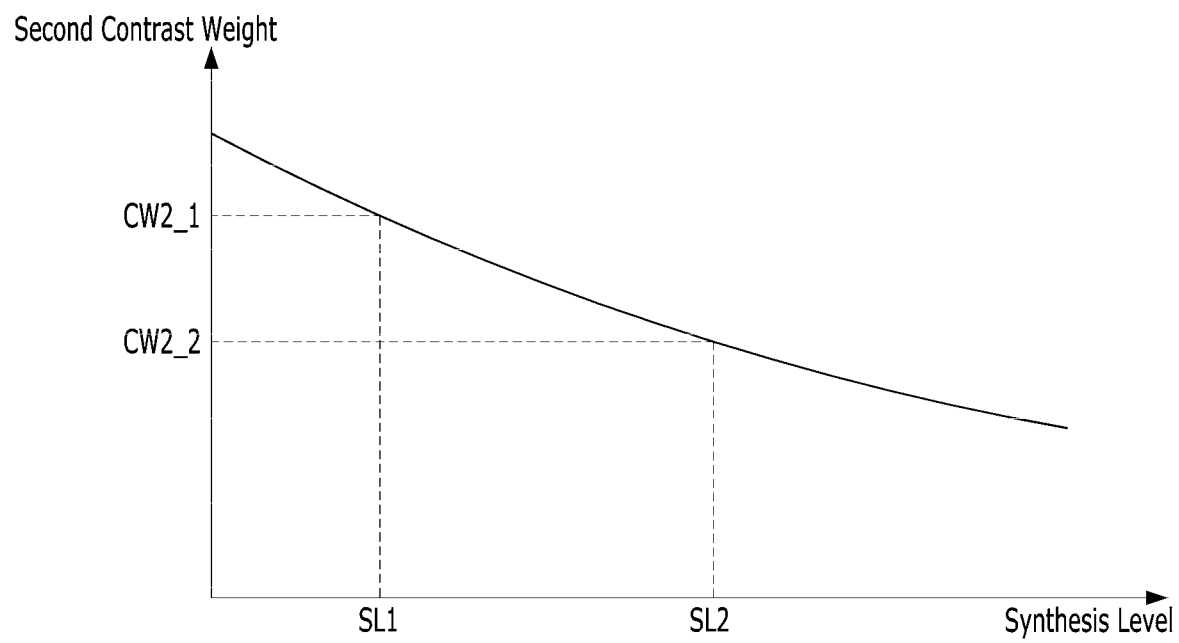
FIG. 11 is an exemplary graph of a second contrast weight function generated by the weight generator of FIG. 9.

FIG. 9 is a block diagram of an exemplary embodiment of the image processing device of FIG. 8. FIG. 10 is a conceptual view of an exemplary embodiment of sub frames input to the dynamic range synthesizer of FIG. 9 and a synthesized frame output from the dynamic range synthesizer. FIG. 11 is an exemplary graph of a second contrast weight function generated by the weight generator of FIG. 9.

Referring to FIG. 9, the image processing device 1200 may include a sensor interface 401, a sensor buffer 402, a buffer interface 403, a dynamic range synthesizer 405, a first interface 410, a tone mapping circuit 420, a knee curve generator 430, a weight generator 440, a local contrast enhancer 450, and a second interface 460.

The sensor interface 401 receives data streams DS from the image sensor 1100 of FIG. 8. The sensor interface 401 sequentially accumulates the data streams DS in the sensor buffer 402. The accumulated data streams DS stored in the sensor buffer 402 may form the sub frames SFR. The sub frames SFR may have different exposure times as described above. The buffer interface 403 is coupled to the sensor buffer 402. The buffer interface 403 may read the sub frames SFR from the the sensor buffer 402 and transmit the sub frames SFR to the dynamic range synthesizer 405. The buffer interface 403 may also transfer the sub frames SFR to the knee curve generator 430 such that the knee curve generator 430 may generate the knee curve signal KCS based on the sub frames SFR.

The remaining components operate similarly to those with like numerals in FIG. 1, except for the weight generator 440, which provides two contrast weights in this embodiment as opposed to one contrast weight in the FIG. 1 embodiment. More specifically, the dynamic range synthesizer 405 synthesizes the sub frames SFR to generate a first frame FR1 including pixel values having a first dynamic range. The dynamic range synthesizer 405 may determine, for each pixel, one synthesis level of a predetermined range such as 0-255 or 0-767 based on at least one luminance of corresponding pixel values of the sub frames SFR, and may determine synthesis weights for the pixel values of the sub frames SFR. In an exemplary embodiment, the dynamic range synthesizer 405 may increase the synthesis level as a luminance of the pixel value of the sub frame corresponding to a first exposure time increases when the luminance is greater than a threshold value. In this manner, the dynamic range synthesizer 405 may decrease a synthesis weight for the pixel value of the sub frame corresponding to the first exposure time as the synthesis level increases, and may increase a synthesis weight for the pixel value of the sub frame corresponding to a second exposure time less than the first exposure time as the synthesis level increases.

The dynamic range synthesizer 405 may then adjust the pixel values of the sub frames SFR using the synthesis weights, and may determine a pixel value of the first frame FR1 according to the adjusted pixel values of the sub frames SFR. The dynamic range synthesizer 405 may add the adjusted pixel values of the sub frames FR to each other to determine the pixel value of the first frame FR1. Referring to FIG. 10, a first sub frame SFR1 captured with a relatively long exposure time and a second sub frame SFR2 captured with a relatively short exposure time may be provided. The dynamic range synthesizer 405 may apply first synthesis weights to the pixel values SP1 to SP16 of the first sub frame SFR1, respectively, to obtain a weighted first sub frame SFR1' including pixel values SP1' to SP16'. The dynamic range synthesizer 405 may also apply second synthesis weights to the pixel values SP1 to SP16 of the second sub frame SFR2, respectively, to obtain a weighted second sub frame SFR2' including pixel values SP1' to SP16'. Then, the dynamic range synthesizer 405 may add pixel values of the same pixels of the weighted first sub frame SFR1' and the weighted second sub frame SFR2' to generate the first frame FR1 that includes pixel values PV1_1 to PV1_16. The sum of the first synthesis weight and the second synthesis weight for each pixel may be 1. That is, the first synthesis weight and the second synthesis weight for each pixel may be interdependent. The synthesis weight is shown as being provided in a unit of pixel, however, the synthesis weight may be provided in a unit of a local region of each sub frame. FIG. 10 shows two sub frames SFR1 and SFR2 being synthesized to generate the first frame FR1, however, more sub frames may be provided to be synthesized to generate the first frame FR1.

Referring back to FIG. 9, the first interface 410, the tone mapping circuit 420 including gain generator 421 and tone mapper 422, and the knee curve generator 430 may be configured the same as the first interface 110, the tone mapping circuit 120 including the gain generator 121, and the tone mapper 122, respectively. Accordingly descriptions of these components are unnecessary and will be omitted to avoid redundancy.

The weight generator 440 receives conversion gain factors CG from the tone mapping circuit 420. The weight generator 440 may provide first contrast weights CW1 depending on the conversion gain factors CG as described with reference to the contrast weights CW of FIG. 1.

The weight generator 440 may further receive the synthesis levels SL from the dynamic range synthesizer 405. The weight generator 440 provides second contrast weights CW2 depending on the synthesis levels SL, respectively. The weight generator 440 may decrease the second contrast weight as its corresponding synthesis level increases. Referring to FIG. 11, the x-axis denotes the synthesis level and y-axis denotes the second contrast weight. The weight generator 440 generates a second contrast weight CW2_1 in response to a first synthesis level SL1. The weight generator 440 generates a second contrast weight CW2_2 less than the second contrast weight CW2_1 in response to a second synthesis level SL2 greater than the first synthesis level SL2. As such, the second contrast weight decreases as the synthesis level increases. In an exemplary embodiment, the second contrast weight is inversely proportional to the synthesis weight.

As such, the synthesis weight for the pixel value of the sub frame having the first exposure time and the synthesis weight for the pixel value of the sub frame having the second exposure time less than the first exposure time may be determined by the synthesis level. Therefore, each of the second contrast weights CW2 is associated with at least one of the synthesis weight for the pixel value of the sub frame having the first exposure time and the synthesis weight for the pixel value of the sub frame having the second exposure time. For example, each of the second contrast weights CW2 may decrease as the synthesis weight for the pixel value of the sub frame having the second exposure time increases.

Referring back to FIG. 9, the local contrast enhancer 450 communicates with the tone mapping circuit 420 and the second interface 460. The local contrast enhancer 450 may enhance local contrasts of the second frame FR2 based on the first contrast weights CW1 as described with reference to FIG. 1. Also, the local contrast enhancer 450 may enhance the local contrasts of the second frame FR2 further based on the second contrast weights CW2. The local contrast enhancer 150 may generate variation values from the pixel values of the second frame FR2, may modify the variation values according to the first contrast weights CW1 and the second contrast weights CW2, and may adjust the pixel values of the second frame FR2 according to the modified variation values. The local contrast enhancer 150 outputs the second frame FR2 having the enhanced local contrasts as a third frame FR3.

The sub frame having the short exposure time may include a relatively large amount of noise in a unit area due to, for example, insufficient exposure time. That is, the sub frame having a short exposure time may have a relatively high signal to noise ratio (SNR). In case where pixel values of the sub frame having the short exposure time are weighted with relatively high synthesis weights while pixel values of the sub frame having the long exposure time are weighted with relatively low synthesis weights in performing of the sub frame synthesis, corresponding pixel values of the second frame FR2 may include noise greater than noise of other pixel values of the second frame FR2. According to an exemplary embodiment, the second contrast weight is decreased as the synthesis weight applied to a corresponding pixel value of the sub frame having the short exposure time increases. Accordingly, the pixel values of the third frame FR3 may have relatively low noise, and thus the image processing device 400 may output the third frame FR3 with improved local contrasts.

In an exemplary embodiments, the sensor interface 401, the buffer interface 403, the dynamic range synthesizer 405, the first interface 410, the tone mapping circuit 420, the knee curve generator 430, the weight generator 440, the local contrast enhancer 450, and the second interface 460 each may be implemented via software, a hardware chip, an application ASIC, FPGAs, firmware, or a combination thereof. In case where the component is implemented via software, firmware, or a combination thereof, the image processing device 400 may include one or more processors and one or more memories including code (e.g., instructions) configured to cause the one or more processors to perform operations and/or functions of the component.

Figure 12:
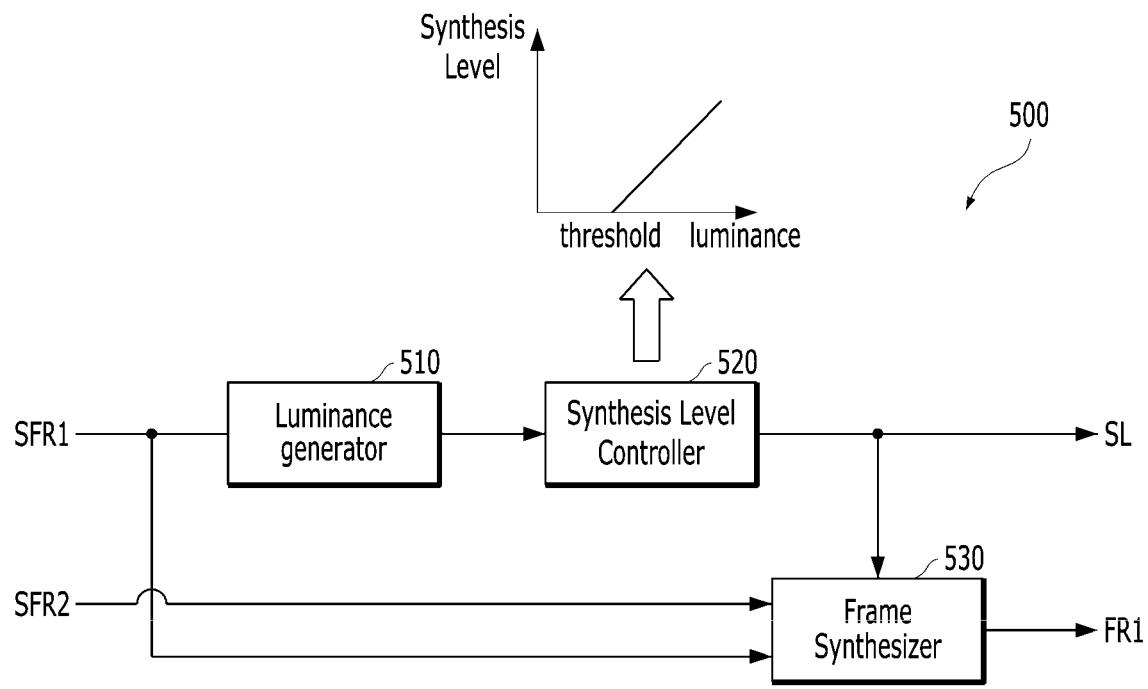
FIG. 12 is a block diagram of an exemplary embodiment of the dynamic range synthesizer of FIG. 9.

FIG. 12 is a block diagram of an exemplary embodiment of the dynamic range synthesizer of FIG. 9.

Referring to FIG. 12, a dynamic range synthesizer 500 may include a luminance generator 510, a synthesis level controller 520, and a frame synthesizer 530. The luminance generator 510 receives a first sub frame SFR1 having a first exposure time greater than a second exposure time of a second sub frame SFR2. The luminance generator 510 may generate a luminance for each pixel value of the first sub frame SFR1 by calculating the average of a corresponding pixel value and pixel values surrounding the corresponding pixel value.

The synthesis level controller 520 receives the luminances of respective pixel values of the first sub frame SFR1 generated by the luminance generator. The synthesis level controller 520 may determine synthesis levels of respective pixels based on the luminances of respective pixel values of the first sub frame SFR1. For example, the synthesis level controller 520 outputs each synthesis level according to a graph shown in FIG. 11. In the graph, x-axis denotes the luminance of the pixel value of the first sub frame SFR1, and y-axis denotes a synthesis level output from the synthesis level controller 520. In other words, the synthesis level controller 520 may determine each synthesis level according to the following equation 3.

$$sl = \begin{cases} 0, & lmnc - thr < 0 \\ \dfrac{lmnc - thr}{b}, & lmnc - thr \geq 0 \end{cases} \quad \text{Eq. 3}$$

lmnc denotes the luminance of the pixel value of the first sub frame SFR1, thr denotes a predetermined threshold of the graph of FIG. 11, b denotes a predetermined constant representing a slope of the graph of FIG. 11, and sl denotes the synthesis level. As such, the synthesis level controller 520 may output 0 as the synthesis level when the luminance is less than the threshold thr, and may increase the synthesis level as the luminance increases when the luminance is equal to or greater than the threshold thr. In addition, the synthesis level may be determined in various manners by using at least one of pixel values of the first sub frame SFR1 and the second sub frame SFR2.

The frame synthesizer 530 receives the first sub frame SFR1 and the second sub frame SFR2, and synthesize the first and second sub frames SFR1 and SFR2 to provide the first frame FR1. The frame synthesizer 530 may determine a first synthesis weight and a second synthesis weight depending on the synthesis level for a corresponding pixel. As described with reference to FIG. 10, the frame synthesizer 530 may apply the first synthesis weight to a pixel value of the first sub frame SFR1, may apply the second synthesis weight to a pixel value of the second sub frame SFR2, and may add the weighted pixel values of the first and second sub frames SFR1 and SFR2 to determine a corresponding pixel value of the first frame FR1. The frame synthesizer 530 increases the second synthesis weight as the synthesis level increases. The sum of the first synthesis weight and the second synthesis weight for each pixel may be 1.

FIG. 12 shows an exemplary embodiment of the dynamic range synthesizer 500 synthesizing two sub frames SFR1 and SFR2. However, it is understood that the dynamic range synthesizer may synthesize more than two sub frames. In this manner, the dynamic range synthesizer may determine synthesis levels for pixels based on at least one of such sub frames, and may synthesize the sub frames depending on the synthesis levels.

Figure 13:
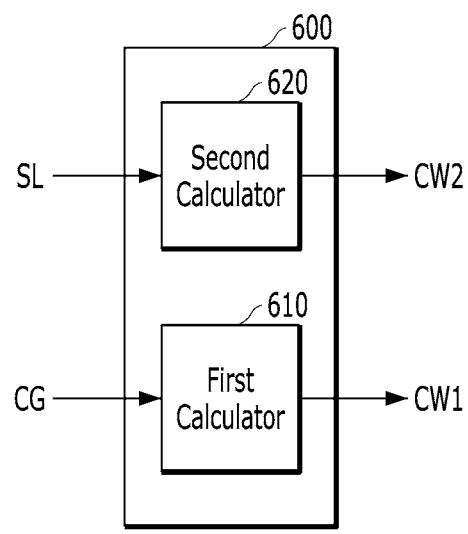
FIG. 13 is a block diagram of an exemplary embodiment of the weight generator of FIG. 9.

FIG. 13 is a block diagram of an exemplary embodiment of the weight generator of FIG. 9.

Referring to FIG. 13, a weight generator 600 may include a first calculator 610 and a second calculator 620. The first calculator 610 may generate the first contrast weights CW1 based on the conversion gain factors CG as described with reference to FIG. 5.

The second calculator 520 receives the synthesis levels SL from the dynamic range synthesizer 405. The second calculator 520 may generate the second contrast weights CW2 based on the the synthesis levels SL, respectively. The second calculator 520 may decrease the second contrast weight as the corresponding synthesis level increases. As such, the second contrast weight decreases as a synthesis weight applied to a pixel value of a sub frame having a short exposure time increases. The second calculator 220 may determine the second contrast weights CW2 by processing the synthesis levels SL, respectively, according to the following equation 4.

$$cw2 = e^{-\left(\frac{sl}{c}\right)} \quad \text{Eq. 4}$$

sl denotes the synthesis level, c denotes an adjustable constant, and cw2 is the second contrast weight. The second contrast weights cw2 is inversely proportional to the synthesis level sl according to the equation 4.

Figure 14:
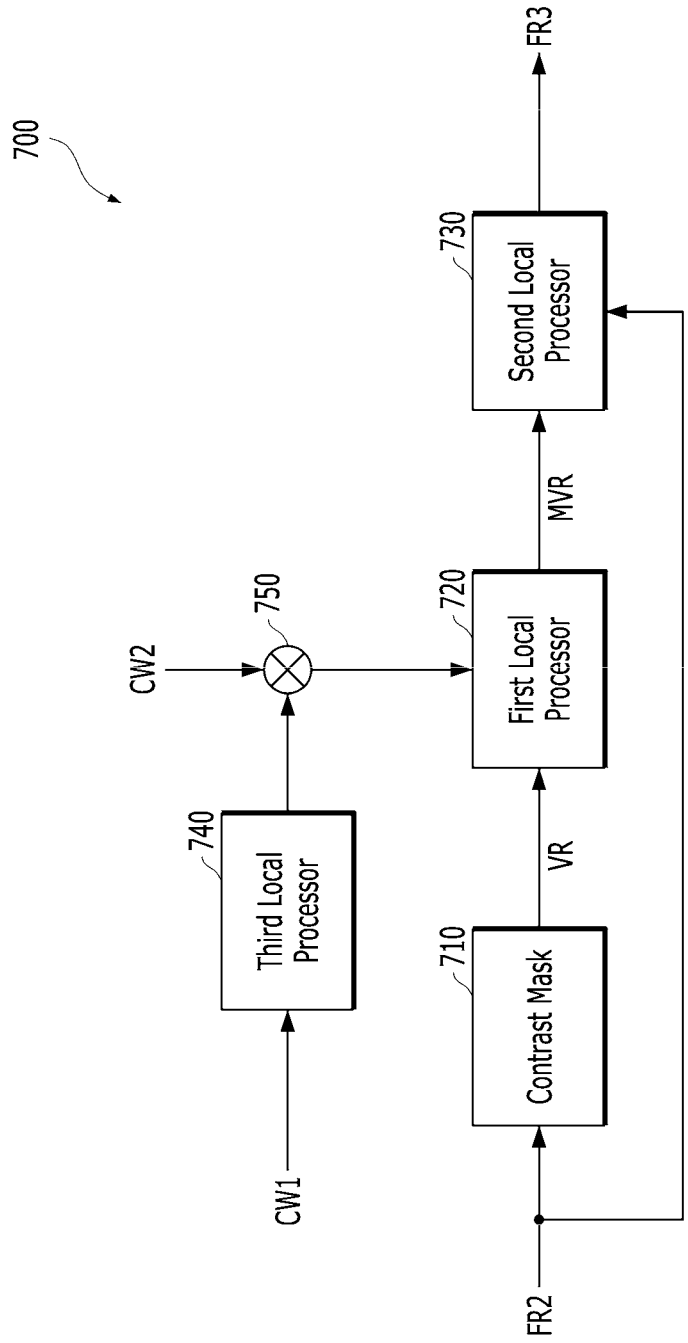
FIG. 14 is a block diagram of an exemplary embodiment of the local contrast enhancer of FIG. 9.

FIG. 14 is a block diagram of an exemplary embodiment of the local contrast enhancer of FIG. 9.

Referring to FIG. 14, a local contrast enhancer 700 may include a contrast mask 710, a first local processor 720, a second local processor 730, a third local processor 740, and a multiplier 750. The contrast mask 710, the first local processor 720, and the second local processor 730 may be configured substantially the same as the contrast mask 310, the first local processor 320, and the second local processor 330 of FIG. 6, respectively. Accordingly descriptions of these components are unnecessary and will be omitted.

The third local processor 740 may receive and process the first contrast weights CW1. The third local processor 740 may multiply each of the first contrast weights CW1 by a certain constant and output the processed first contrast weights CW1. The certain constant may vary depending on exemplary embodiments of the image processing device 1200. The multiplier 750 may multiply the processed first contrast weights CW1 by the second contrast weights CW2, respectively. The output signals of the multiplier 750 are transferred to the first local processor 720, and the first local processor 720 may modify the variation values VR according to the output signals of the multiplier 750.

Figure 15:
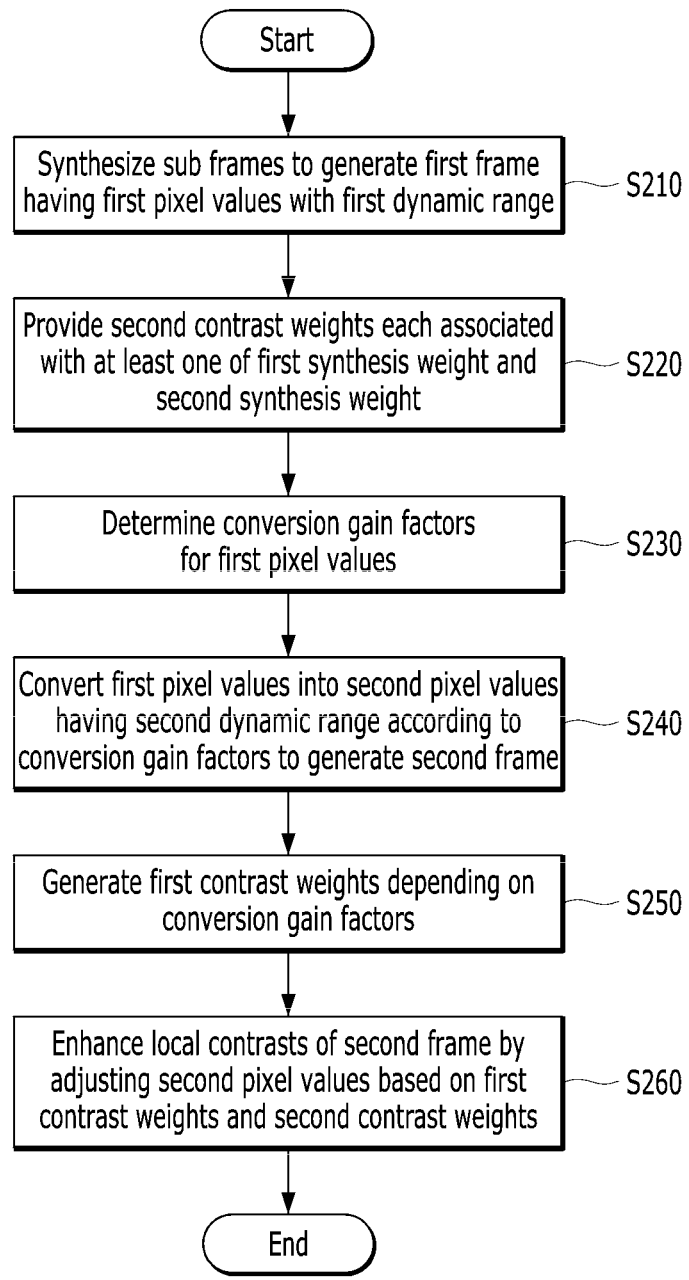
FIG. 15 is a flowchart of another exemplary embodiment of a method of operating the image processing device according to the principles of the invention.

FIG. 15 is a flowchart of another exemplary embodiment of a method of operating the image processing device according to the principles of the invention.

Referring to FIG. 15, at step S210, sub frames are synthesized to generate a first frame having first pixel values with a first dynamic range. For each pixel, a first synthesis weight and a second synthesis weight for a first sub frame and a second sub frame of the sub frames may be determined, the pixel values of the first and second sub frames may be adjusted using the first and second synthesis weights, respectively. The second sub frame may have an exposure time less than that of the first frame. A corresponding pixel value of the first frame may be determined according to the adjusted pixel values of the sub frames.

At step S220, second contrast weights each associated with at least one of the first and second synthesis weights are provided. The second contrast weight may decrease as the second synthesis weight increases.

Step S230, step S240, and step S250 may be substantially the same as step S110, step S120, and step S130 of FIG. 7, respectively. Accordingly descriptions of these steps are unnecessary and will be omitted to avoid redundancy.

At step S260, a local contrast enhancement is performed on a second frame by adjusting second pixel values of the second frame based on first contrast weights and the second contrast weights. Variation values may be generated from the pixel values of the second frame, and the variation values may be modified based on the first contrast weights and the second contrast weights. The pixel values of the second frame may be adjusted according to the modified variation values to generate third pixel values that are included in a third frame.

Since the second contrast weight reflected to the variation value is decreased as the second synthesis weight applied to a corresponding pixel value of the sub frame having the short exposure time increases, the pixel values of the third frame may have relatively low noise. Thus, the local contrasts of the third frame may be improved.

Figure 16:
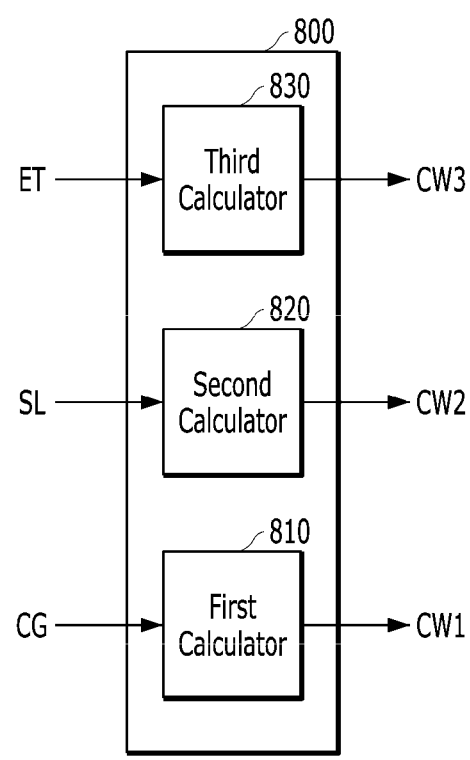
FIG. 16 is a block diagram of another exemplary embodiment of the weight generator of FIG. 9.

FIG. 16 is a block diagram of another exemplary embodiment of the weight generator of FIG. 9.

Referring to FIGS. 9 and 16, a weight generator 800 may include a first calculator 810, a second calculator 820, and a third calculator 830. The first calculator 810 and the second calculator 820 may be configured substantially the same as the first calculator 610 and the second calculator 620 of FIG. 13, respectively. Accordingly descriptions of these components are unnecessary and will be omitted to avoid redundancy.

The third calculator 830 receives exposure time information from, for example, the main processor of 1400. The exposure time information may indicate a first exposure time in which a first frame of the sub frames SFR is captured and a second exposure time in which a second frame of the sub frames SFR is captured. The second exposure time is less than the first exposure time. In an exemplary embodiment, the first exposure time may be the longest of exposure times of the sub frames SFR, and the second exposure time may be the shortest of the exposure times of the sub frames SFR. The third calculator 830 may generate a third contrast weight CW3 depending on the first and second exposure times. In an exemplary embodiment, the third calculator 830 may generate the third contrast weight CW3 as a ratio of the second exposure time to the first exposure time, such as ¼, ¹⁄₁₆, or ¹⁄₃₂. The third contrast weight CW3 may be determined as the following equation 5.

$$CW3 = \frac{ET2}{ET1} \quad \text{Eq. 5}$$

ET1 denotes the first exposure time, ET2 denotes the second exposure time, and CW3 denotes the third contrast weight.

Figure 17:
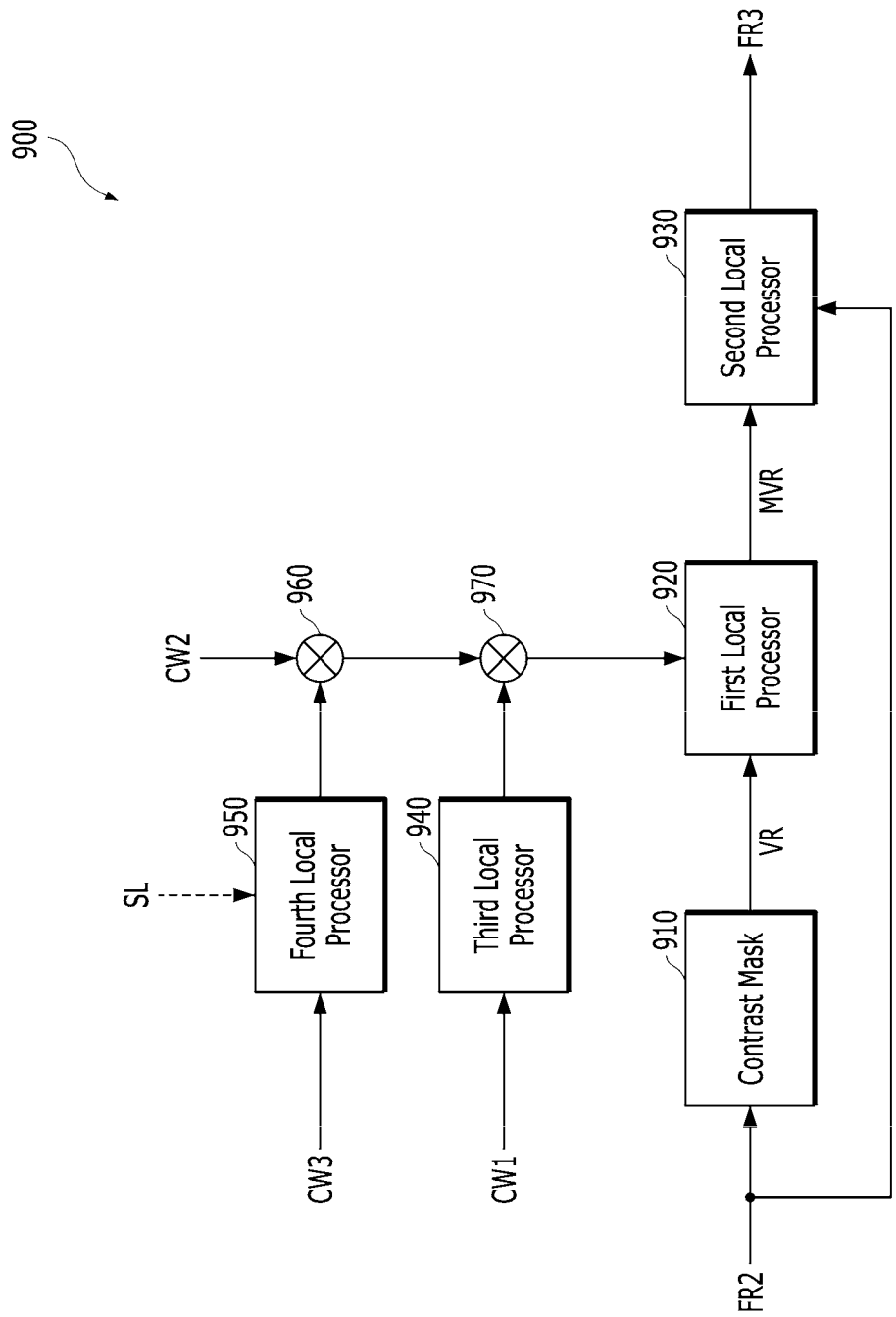
FIG. 17 is a block diagram of another exemplary embodiment of the local contrast enhancer of FIG. 9.
Figure 18:
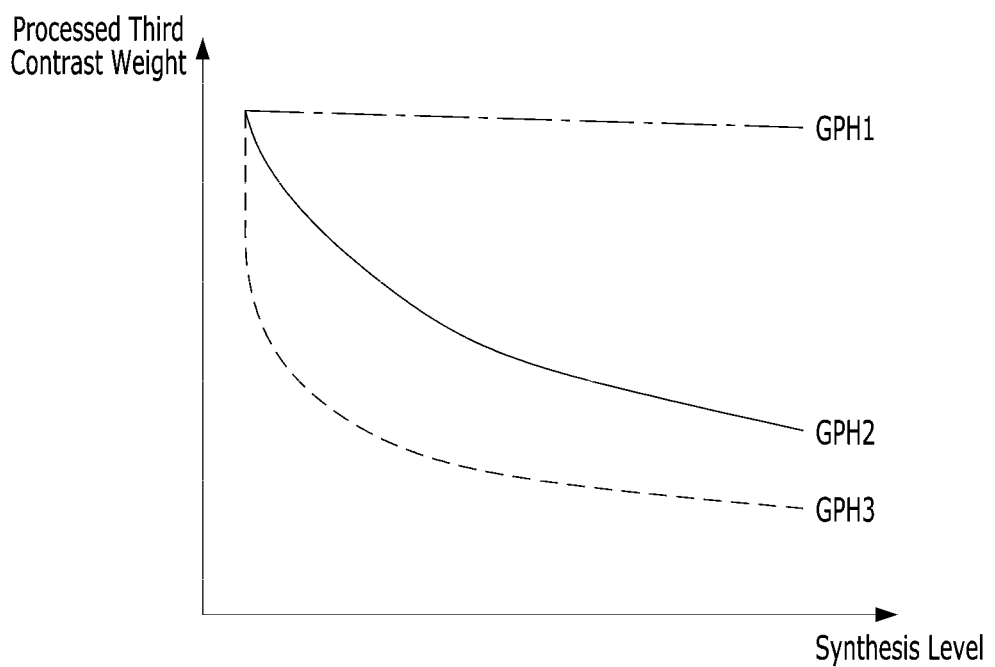
FIG. 18 is an exemplary graph of a third contrast weight function adjusted by the fourth local processor of FIG. 17.

FIG. 17 is a block diagram of another exemplary embodiment of the local contrast enhancer of FIG. 9. FIG. 18 is an exemplary graph of a third contrast weight function adjusted by the fourth local processor of FIG. 17.

Referring to FIG. 17, a local contrast enhancer 900 may include a contrast mask 910, a first local processor 920, a second local processor 930, a third local processor 940, a fourth local processor 950, a first multiplier 960, and a second multiplier 970. The contrast mask 910, the first local processor 920, the second local processor 930, the third local processor 940 may be configured substantially the same as the contrast mask 710, the first local processor 720, the second local processor 730, and the third local processor 740, respectively. Accordingly descriptions of these components are unnecessary and will be omitted to avoid redundancy.

The fourth local processor 950 may receive and process the third contrast weight CW3. The fourth local processor 950 may multiply the third contrast weight CW3 by an adjustable constant and output the processed third contrast weight CW3. The first multiplier 960 may multiply each of the second contrast weights CW2 by the processed third contrast weight CW3. The second multiplier 970 may multiply the output signals of the first multiplier 960 by the processed first contrast weights CW1, respectively. The first local processor 920 may modify the variation values VR according to the output signals of the second multiplier 970.

In an exemplary embodiment, the fourth local processor 950 may further receive the synthesis levels SL, and generate the third contrast weights processed based on the third contrast weight CW3 and the synthesis levels SL. Referring to FIG. 18, the x-axis denotes the synthesis levels SL, and y-axis denotes the processed third contrast weights. The fourth local processor 950 may generate the processed third contrast weights in response to the synthesis levels SL, respectively, according to signals corresponding to a first graph GPH1 when the third contrast weight CW3 is equal to or greater than a first reference value. The fourth local processor 950 may use signals corresponding to a second graph GPH2 to generate the processed third contrast weights when the third contrast weight CW3 is less than the first reference value and is equal to or greater than a second reference value less than the first reference value. The fourth local processor 950 may use signals corresponding to a third graph GPH3 when the third contrast weight CW3 is less than the second reference value. As such, the processed third contrast weight generated in response to the same synthesis level may decrease as the third contrast weight CW3 decreases. Data including the signals of the first to third graphs GPH1 to GPH3 may be stored in a storage medium associated with the image capturing apparatus 1000 of FIG. 8.

The first exposure time may be fixed, and the second exposure time may be varied in response to, for example, the amount of light entering through the lens 1005 shown in FIG. 8. In the case where the second exposure time is relatively short, the sub frame having the second exposure time may include a relatively large amount of noise in a unit area. In this case, the second frame FR2 generated based on the sub frame having the second exposure time may include a relatively large amount of noise in a unit area. According to the exemplary embodiment, the third contrast weight CW3 is decreased as the ratio of the second exposure time to the first exposure time decreases. Accordingly, the pixel values of the third frame FR3 may have relatively low noise, thereby outputting the third frame FR3 with the improved local contrasts.

Figure 19:
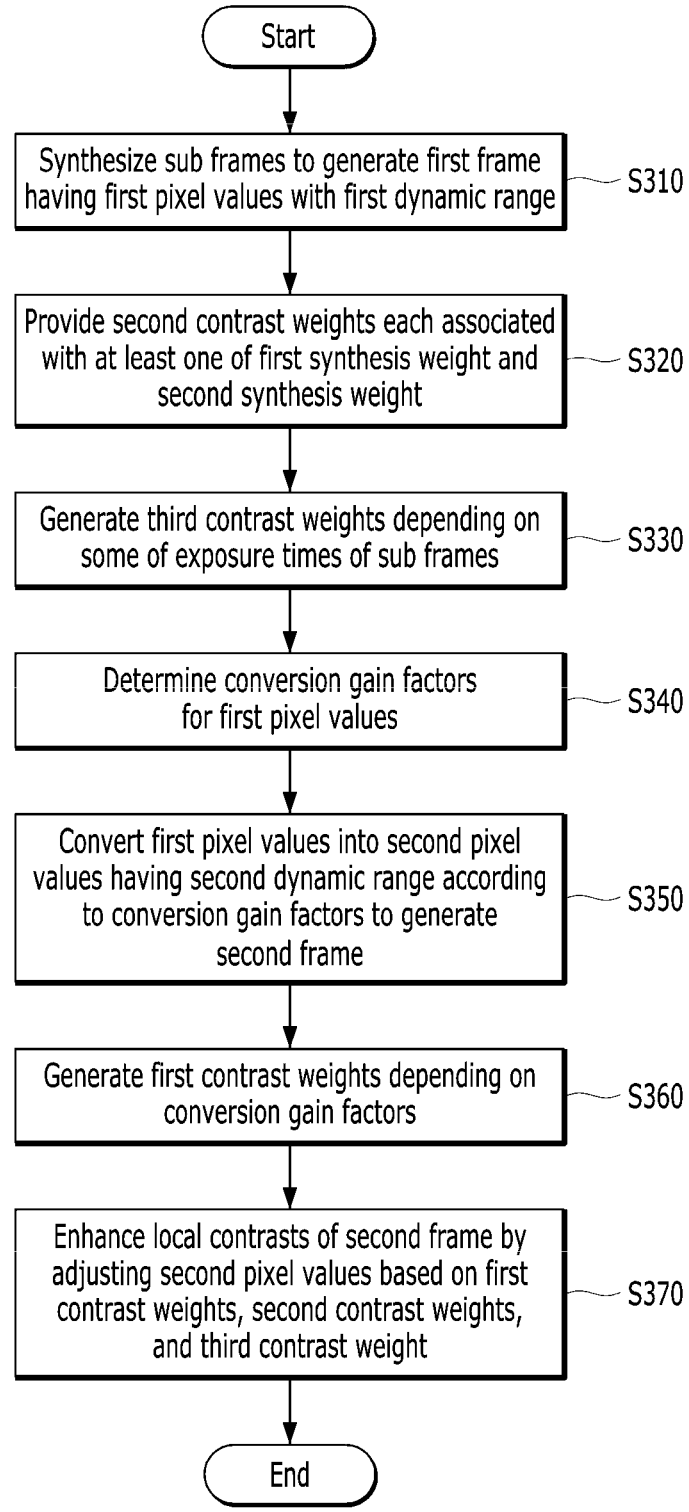
FIG. 19 is a flowchart of still another exemplary embodiment of a method of operating the image processing device according to the principles of the invention.

FIG. 19 is a flowchart of still another exemplary embodiment of a method of operating the image processing device according to the principles of the invention.

Referring to FIG. 19, step S310, step S320, step S340, step S350, and step S360 may be substantially the same as step S210, step S220, step S230, step S240, and step S250 of FIG. 15, respectively. Accordingly descriptions of these components are unnecessary and will be omitted to avoid redundancy.

At step S330, a third contrast weight is generated depending on some of exposure times of sub frames. The third contrast weight may be determined based on a first exposure time of a first sub frame and a second exposure time of a second sub frame, the second exposure time being less than the first exposure time. The first exposure time may be the longest of exposure times of the sub frames, and the second exposure time may be the shortest of the exposure times of the sub frames. The third contrast weight may be determined as a ratio of the second exposure time to the first exposure time.

At step S370, a local contrast enhancement is performed on a second frame by adjusting second pixel values of the second frame based on first contrast weights, second contrast weights, and the third contrast weight. Variation values may be generated from the pixel values of the second frame, and the variation values may be modified based on the first contrast weights, the second contrast weights, and the third contrast weight. The pixel values of the second frame may be adjusted according to the modified variation values to generate third pixel values that are included in a third frame.

The third contrast weight reflected to the variation value decreases as the ratio of the second exposure time to the first exposure time decreases. Accordingly, the pixel values of the third frame may have a relatively low amount of noise. Thus, the local contrasts of the third frame may be improved.

Although certain exemplary embodiments and implementations have been described herein, other embodiments and modifications will be apparent from this description. Accordingly, the inventive concepts are not limited to such embodiments, but rather to the broader scope of the presented claims and various obvious modifications and equivalent arrangements.

What is claimed is:

1. An image processing device comprising:
a first interface to receive a first frame having a first pixel value with a first dynamic range;
a dynamic range converter to convert the first pixel value having the first dynamic range into a second pixel value having a second dynamic range according to a conversion gain factor to generate a second frame having the second pixel value with the second dynamic range, the second dynamic range being less than the first dynamic range;
a weight generator to receive the conversion gain factor and to generate a first contrast weight signal depending on the conversion gain factor; and a contrast modifier to enhance a local contrast of the second frame by adjusting the second pixel value of the second dynamic range based on the first contrast weight signal, wherein the contrast modifier comprises:

a contrast mask to generate a variation value from the second pixel value;

a first local processor to modify the variation value based on the first contrast weight signal; and a second local processor to adjust the second pixel value according to the modified variation value to provide the second frame having the enhanced local contrast.

2. The image processing device of claim 1, wherein the weight generator is operable to increase the first contrast weight signal as the conversion gain factor decreases.

3. An image processing device comprising:

a first interface to receive a first frame having a first pixel value with a first dynamic range;

a second interface to receive sub frames;

a dynamic range synthesizer to synthesize the sub frames to generate the first frame having the first pixel value with the first dynamic range, a dynamic range converter to convert the first pixel value having the first dynamic range into a second pixel value having a second dynamic range according to a conversion gain factor to generate a second frame having the second pixel value with the second dynamic range, the second dynamic range being less than the first dynamic range;

a weight generator to receive the conversion gain factor and to generate a first contrast weight signal depending on the conversion gain factor; and a contrast modifier to enhance a local contrast of the second frame by adjusting the second pixel value of the second dynamic range based on the first contrast weight signal, wherein the dynamic range synthesizer is operable to adjust a pixel value of a first sub frame of the sub frames using a first synthesis weight, to adjust a pixel value of a second sub frame of the sub frames using a second synthesis weight, and to determine the first pixel value of the first frame according to the adjusted pixel value of the first sub frame and the adjusted pixel value of the second sub frame, the second synthesis weight being decreased as the first synthesis weight increases.

4. An image processing device comprising:

a first interface to receive a first frame having a first pixel value with a first dynamic range;

a second interface to receive sub frames;

a dynamic range synthesizer to synthesize the sub frames to generate the first frame having the first pixel value with the first dynamic range, wherein the dynamic range synthesizer is operable to adjust a pixel value of a first sub frame of the sub frames using a first synthesis weight, to adjust a pixel value of a second sub frame of the sub frames using a second synthesis weight, and to determine the first pixel value of the first frame according to the adjusted pixel value of the first sub frame and the adjusted pixel value of the second sub frame, the second synthesis weight being decreased as the first synthesis weight increases, a dynamic range converter to convert the first pixel value having the first dynamic range into a second pixel value having a second dynamic range to generate a second frame having the second pixel value with the second dynamic range, the second dynamic range being less than the first dynamic range;

a weight generator to provide a contrast weight signal associated with at least one of the first synthesis weight and the second synthesis weight; and a contrast modifier to enhance a local contrast of the second frame by adjusting the second pixel value having the second dynamic range based on the contrast weight signal.

5. The image processing device of claim 4, wherein the contrast modifier comprises:

a contrast mask to generate a variation value from the second pixel value;

a first local processor to modify the variation value by reflecting the contrast weight signal in the variation value; and a second local processor to adjust the second pixel value according to the modified variation value to provide the second frame having the enhanced local contrast.

6. The image processing device of claim 4, wherein:

the second sub frame is captured using an exposure time shorter than an exposure time of the first sub frame; and the contrast weight signal decreases as the second synthesis weight increases.

7. The image processing device of claim 4, wherein:

the second sub frame is captured using an exposure time shorter than that of the first sub frame;

the dynamic range synthesizer is operable to determine one synthesis level of a predetermined range based on at least one of a luminance of the pixel value of the first sub frame and a luminance of the pixel value of the second sub frame, and to determine the first synthesis weight and the second synthesis weight depending on the determined synthesis level, the second synthesis weight being increased as the determined synthesis level increases; and the weight generator is operable to provide the contrast weight signal in response to the determined synthesis level.

8. The image processing device of claim 7, wherein the contrast weight signal decreases as the determined synthesis level increases.

9. The image processing device of claim 3, wherein:

the second sub frame is captured using an exposure time shorter than an exposure time of the first sub frame;

the weight generator is operable to provide a third contrast weight signal as a ratio of the exposure time of the second sub frame to the exposure time of the first sub frame; and the contrast modifier is operable to adjust the second pixel value having the second dynamic range further based on the third contrast weight signal.

10. The image processing device of claim 9, wherein the third contrast weight signal decreases as the ratio decreases.

11. The image processing device of claim 1, wherein the dynamic range converter comprises a tone mapper to convert the first pixel value having the first dynamic range into the second pixel value having the second dynamic range based on the conversion gain factor.

12. The image processing device of claim 1, wherein the contrast modifier comprises a local contrast enhancer to enhance the local contrast of the second frame.

13. A method of performing a local contrast enhancement, the method comprising steps of:

receiving sub frames in a storage device;

synthesizing at least two of the sub frames to generate a first frame having a first pixel value with a first dynamic range by:
  adjusting a pixel value of a first sub frame of the sub frames using a first synthesis weight;
  adjusting a pixel value of a second sub frame of the sub frames using a second synthesis weight; and
  determining the first pixel value of the first frame according to the adjusted pixel value of the first sub frame and the adjusted pixel value of the second sub frame, the second synthesis weight being decreased as the first synthesis weight increases;
determining a conversion gain factor for the first pixel value;
converting the first pixel value having the first dynamic range into a second pixel value having a second dynamic range according to the conversion gain factor to generate a second frame having the second pixel value with the second dynamic range, the second dynamic range being less than the first dynamic range;
generating a first contrast weight signal depending on the conversion gain factor; and
enhancing a local contrast of the second frame by adjusting the second pixel value having the second dynamic range based on the first contrast weight signal.

14. The method of claim 13, further comprising the step of generating a second contrast weight signal associated with at least one of the first synthesis weight and the second synthesis weight,
  wherein the step of enhancing a local contrast of the second frame comprises adjusting the second pixel value having the second dynamic range further based on the second contrast weight signal.

15. The method of claim 14, wherein:
  the second sub frame is captured using an exposure time shorter than an exposure time of the first sub frame; and
  the second contrast weight signal decreases as the second synthesis weight increases.

16. The method of claim 13, further comprising the step of generating a third contrast weight signal as a ratio of the exposure time of the second sub frame to the exposure time of the first sub frame,
  wherein the second sub frame is captured using an exposure time shorter than an exposure time of the first sub frame, and
  wherein the step of enhancing a local contrast of the second frame comprises adjusting the second pixel value having the second dynamic range further based on the third contrast weight signal.

* * * * *